United States Patent
Neelapala et al.

(10) Patent No.: US 12,407,374 B2
(45) Date of Patent: Sep. 2, 2025

(54) REDUCE UWB SIGNAL INTERFERENCE WITH GPS RECEIVER

(71) Applicant: QUALCOMM Incorporated, San Diego, CA (US)

(72) Inventors: Mutyala Rao Neelapala, Rajahmundry (IN); Raghavender Kasturi, Hyderabad (IN); Navaneeth Krishnan Unnikrishnan Nair, Kottarakkara (IN); Phani Kumar Pothina, Hyderabad (IN); Vaseem Syed, Khammam (IN); Akhila Gopu, Hyderabad (IN); Rajasekhar Reddy Chenchala, Nellore (IN); Subramanyam Nalli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 18/506,976

(22) Filed: Nov. 10, 2023

(65) Prior Publication Data
US 2025/0158654 A1    May 15, 2025

(51) Int. Cl.
    H04B 1/717    (2011.01)
    H04B 7/185    (2006.01)

(52) U.S. Cl.
    CPC ....... *H04B 1/7174* (2013.01); *H04B 7/18513* (2013.01)

(58) Field of Classification Search
    CPC .................................................. H04B 1/7174
    (Continued)

(56) References Cited

U.S. PATENT DOCUMENTS

| | | | |
|---|---|---|---|
| 2002/0191690 A1 | 12/2002 | Pendergrass et al. | |
| 2004/0223477 A1* | 11/2004 | Iwasaki | H04W 48/16 370/252 |

(Continued)

FOREIGN PATENT DOCUMENTS

| | | |
|---|---|---|
| WO | 2023164384 A1 | 8/2023 |

OTHER PUBLICATIONS

Godefroy B., et al., "Analysis of Potential CW Interference Effects Caused by UWB Devices on GNSS Receivers", GNSS 2004—Proceedings of the 17th International Technical Meeting of the Satellite Division of the Institute of Navigation (ION GNSS 2004), The Institute of Navigation, 8551 RIXLEW Lane Suite 360 Manassas, VA 20109, USA, Sep. 24, 2004, pp. 187-196, XP056009134, p. 195, right-hand column, line 1—line 10.

(Continued)

*Primary Examiner* — Lihong Yu
(74) *Attorney, Agent, or Firm* — Thien T. Nguyen

(57) ABSTRACT

Aspects presented herein may enable a UE to avoid its UWB communication(s) to interfere with GNSS receiver(s). In one aspect, a UE detects a set of satellite signals for at least one satellite communication channel. The UE identifies a frequency for the detected set of satellite signals in the at least one satellite communication channel. The UE selects a pulse repetition frequency (PRF) for an ultrawide band (UWB) communication of the UE, where the selected PRF is not an integer multiple of the identified frequency for the detected set of satellite signals in the at least one satellite communication channel. In some examples, the UE may also perform the UWB communication based on the selected PRF and receive the detected set of satellite signals, where the performance of the UWB communication and the reception of the detected set of satellite signals are simultaneous.

30 Claims, 14 Drawing Sheets

(58) Field of Classification Search
USPC .......................................................... 375/130
See application file for complete search history.

(56) References Cited

U.S. PATENT DOCUMENTS

| | | | | |
|---|---|---|---|---|
| 2004/0240565 | A1* | 12/2004 | Santhoff | H04L 25/4902 375/259 |
| 2006/0046687 | A1* | 3/2006 | Kwon | H04B 1/7163 455/404.1 |
| 2007/0081577 | A1* | 4/2007 | Reunamaki | H04B 1/71632 375/130 |
| 2009/0121927 | A1* | 5/2009 | Moshfeghi | G01S 19/22 342/357.44 |
| 2018/0081030 | A1* | 3/2018 | McMahon | A61B 5/08 |
| 2021/0333411 | A1* | 10/2021 | Gum | G01S 19/21 |
| 2022/0338028 | A1* | 10/2022 | Desai | H04W 8/22 |

OTHER PUBLICATIONS

International Search Report and Written Opinion—PCT/US2024/045674—ISA/EPO—Dec. 9, 2024.

Luo M., et al., "Testing and Research on Interference to GPS from UWB Transmitters", GPS 2001—Proceedings of the 14th International Technical Meeting of the Satellite Division of the Institute of Navigation (ION GPS 2001), The Institute of Navigation, 8551 RIXLEW Lane Suite 360 Manassas, VA 20109, USA, Sep. 11, 2001-Sep. 14, 2001, pp. 1-13, XP056008856, page 5, right-hand column, line 1—line 10 p. 3, line 15, paragraph 2.3—line 18.

* cited by examiner

Example Beacon Frame Format

| Octets | 1 | 4/10 | variable | 2 | variable | variable | variable | 2/4 |
|---|---|---|---|---|---|---|---|---|
| Frame Control | Sequence Number | Addressing Fields | Auxiliary Security Header | Superframe Specification | GTS Info | Pending Address | Beacon Payload | Frame Check Sequence (FCS) |
| MAC Header (MHR) | | | | MAC Payload | | | | MAC Footer (MFR) |

FIG. 10A

Example Enhanced Beacon Frame Format

| Octets | 1 | variable | variable | variable | variable | variable | 2/4 |
|---|---|---|---|---|---|---|---|
| Frame Control | Sequence Number | Addressing Fields | Auxiliary Security Header | IEs (Header IEs / Payload IEs) 1002 | Pending Address | Beacon Payload | FCS |
| MHR | | | | MAC Payload | | | MFR |

UE 902 may use this header IE(s) to indicate PRF value(s) to peer UWB device(s) after connection

FIG. 10B

Example Header IE Format

| Bits: 0-6 | 7-14 | 15 | Octets: 0-127 |
|---|---|---|---|
| Length | Element ID | Type = 0 | Content |

Keep element ID as 0 for specific head IE
(e.g., vendor specific header IE)
1102

FIG. 11A

Example Element Ies for Header IEs

| Element ID | Name | Enhanced Beacon | Enhanced ACK | Data | Multipurpose | MAC Command | Format subclause | Use description | Used by | Created by |
|---|---|---|---|---|---|---|---|---|---|---|
| 0x00 | Vendor Specific Header IE | X | X | X | X | X | 7.4.2.2 | --- | UL | UL |
| 0x01-0x19 | | | | Reserved | | | | | | |

Some network standards enable vendor specific header IE to be used in enhanced beacon frames
1104

FIG. 11B

REDUCE UWB SIGNAL INTERFERENCE WITH GPS RECEIVER

TECHNICAL FIELD

The present disclosure relates generally to communication systems, and more particularly, to wireless communication involving ultrawide band (UWB).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus detects a set of satellite signals for at least one satellite communication channel. The apparatus identifies a frequency for the detected set of satellite signals in the at least one satellite communication channel. The apparatus selects a pulse repetition frequency (PRF) for an ultrawide band (UWB) communication of a user equipment (UE), where the selected PRF is not an integer multiple of the identified frequency for the detected set of satellite signals in the at least one satellite communication channel.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 10A is a diagram illustrating an example of a beacon frame format in accordance with various aspects of the present disclosure.

FIG. 10B is a diagram illustrating an example of an enhanced beacon frame format in accordance with various aspects of the present disclosure.

FIG. 11A is a diagram illustrating an example of a header IE format in accordance with various aspects of the present disclosure.

FIG. 11B is a diagram illustrating an example of element identifiers/identifications (IDs) for header IEs in accordance with various aspects of the present disclosure.

DETAILED DESCRIPTION

Figure 1:
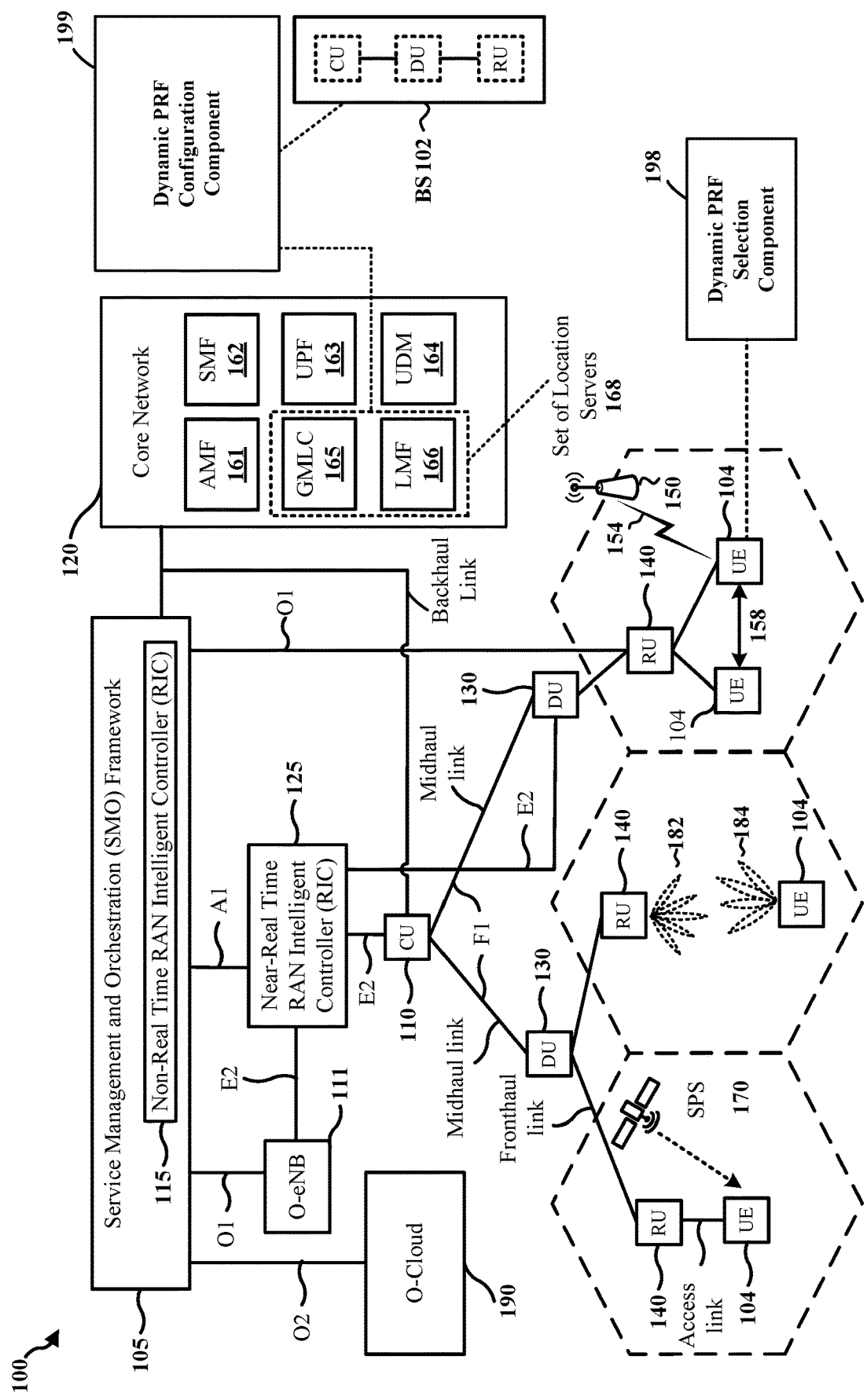
FIG. 1 is a diagram illustrating an example of a wireless communications system and an access network.

Aspects presented herein may enable a wireless device to reduce interference to global navigation satellite system (GNSS) receiver(s) when there is a nearby ultrawide band (UWB) device/chipset/transceiver. For example, aspects presented herein may enable a wireless device that is capable of performing UWB communications or simultaneously performing both the GNSS-based positioning and the UWB communications (e.g., a wireless device that includes both GNSS receiver/chipset and UWB transceiver/chipset) to prevent the UWB communications from interfering (e.g., affecting/degrading) the performance of the GNSS-based positioning.

In one aspect of the present disclosure, a wireless device that is capable of performing UWB communications (and optionally the GNSS-based positioning) may be configured to perform a dynamic selection of pulse repetition frequency (PRF) based on the operating frequency of the GNSS receiver. For example, a UWB device may be configured to perform an energy detection (ED) scan on GNSS channel(s) for a period of time to detect whether there is any GNSS signal(s) prior to performing an actual scan and/or establishing a connection (e.g., a UWB channel) with a peer UWB device. If the UWB device detects GNSS signal(s), the UWB device may be configured to select a PRF that does not have integral multiples of the detected GNSS signal(s) to avoid interfering with the GNSS receiver which it is operating on. For example, if the GNSS receiver is operating on 1.575 GHz, the UWB device may be configured to avoid selecting a PRF that has an integral multiple of 1.575 GHz (e.g., 7.875 MHz, 15.75 MHz, 31.5 MHz, 78.75 MHz, etc.). The UWB device may be specified to perform the ED scan periodically and even after connecting with a peer UWB peer on GNSS channel(s) to adopt different PRFs other than integral multiples of the GNSS receivers.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a dynamic PRF selection component 198 that may be configured to detect a set of satellite signals for at least one satellite communication channel; identify a frequency for the detected set of satellite signals in the at least one satellite communication channel; and select a PRF for an UWB communication of the UE, where the selected PRF is not an integer multiple of the identified frequency for the detected set of satellite signals in the at least one satellite communication channel. In certain aspects, the base station 102 or the one or more location servers 168 may have a dynamic PRF selection configuration component 199 that may be configured to provide configurations and/or parameters related to the PRF selection for the UE 104.

Figure 2:
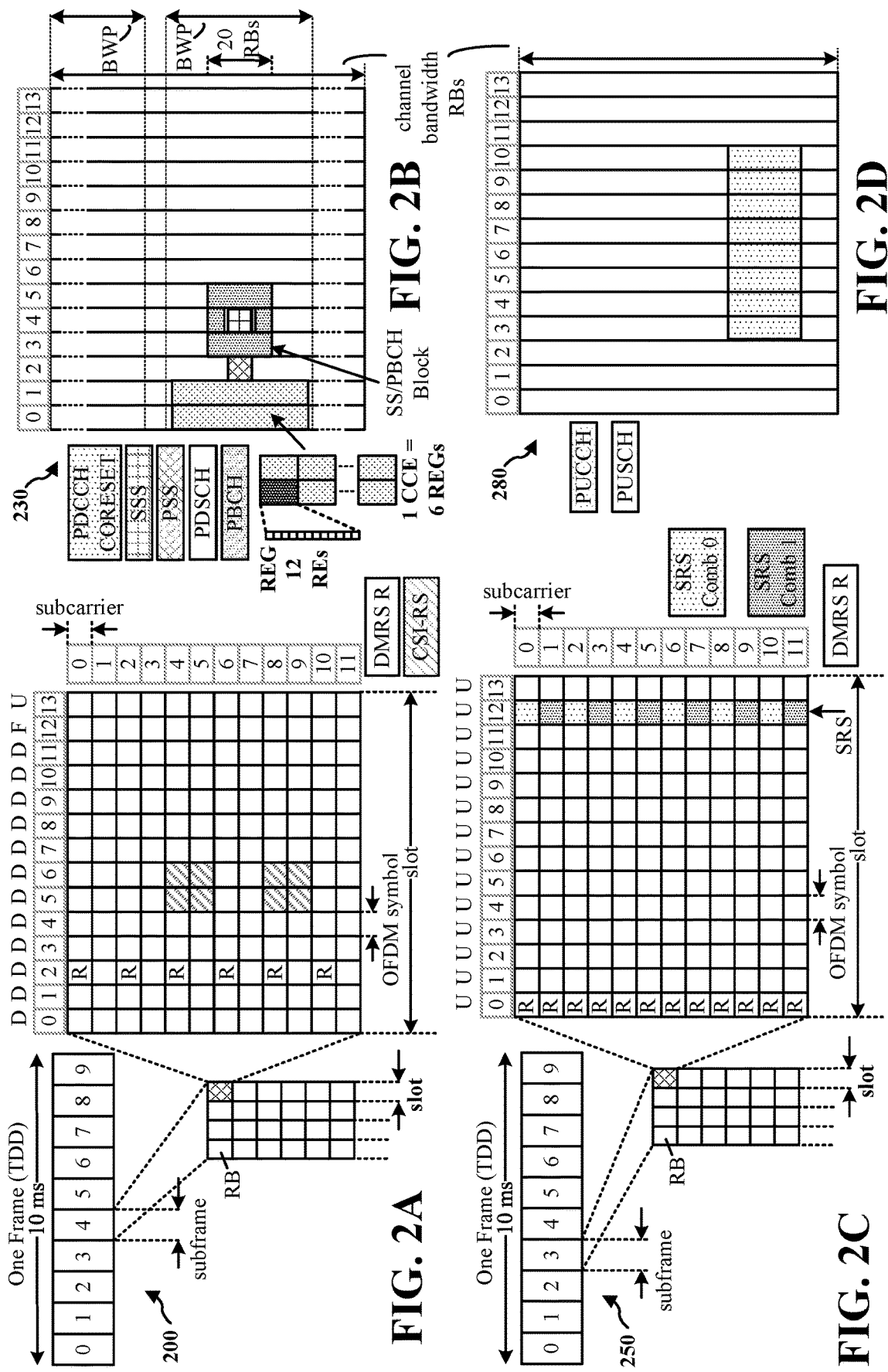
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to 2*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
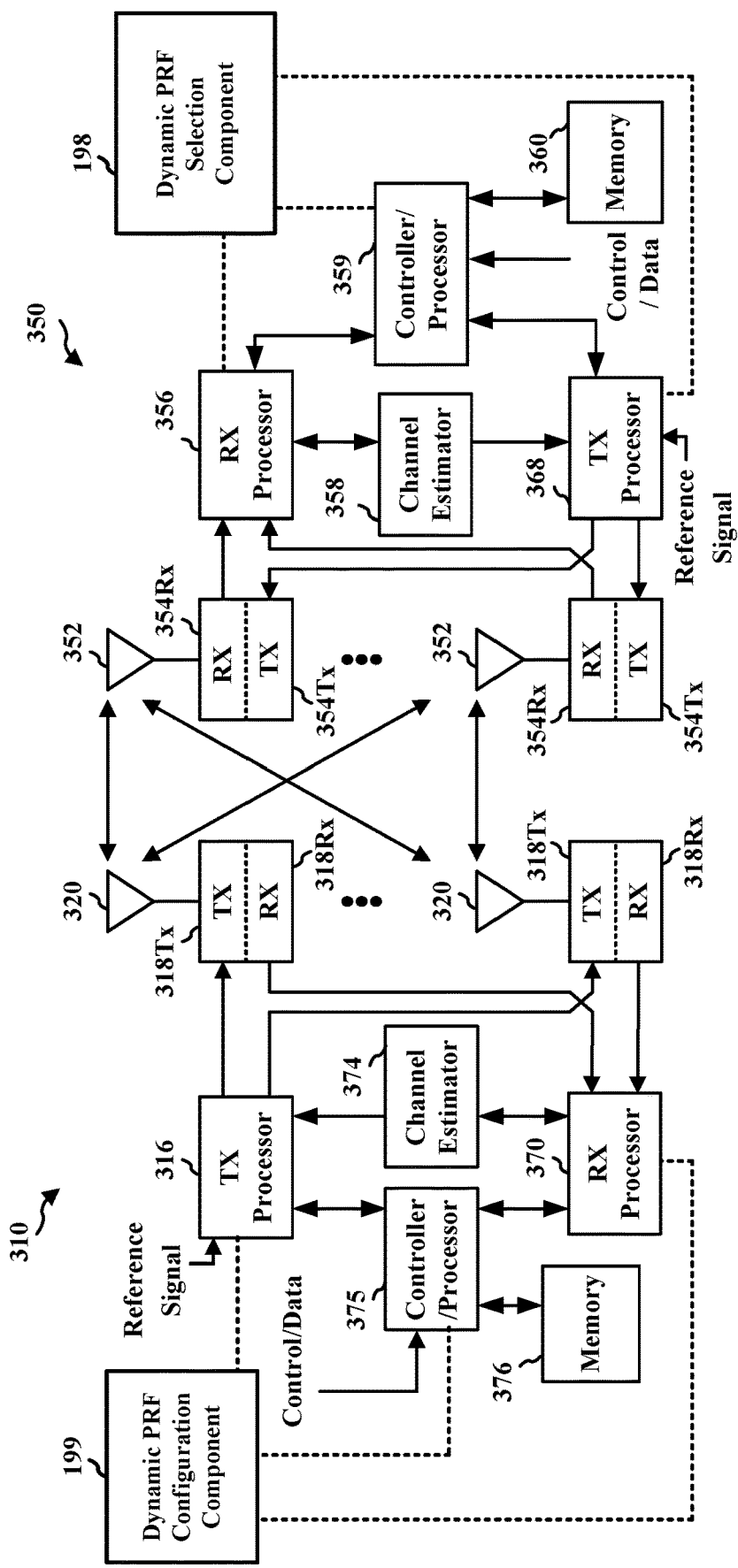
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the dynamic PRF selection component 198 of FIG. 1.

At least one of the TX processor 316, the RX processor 370, and the controller/processor 375 may be configured to perform aspects in connection with the dynamic PRF selection configuration component 199 of FIG. 1.

Figure 4:
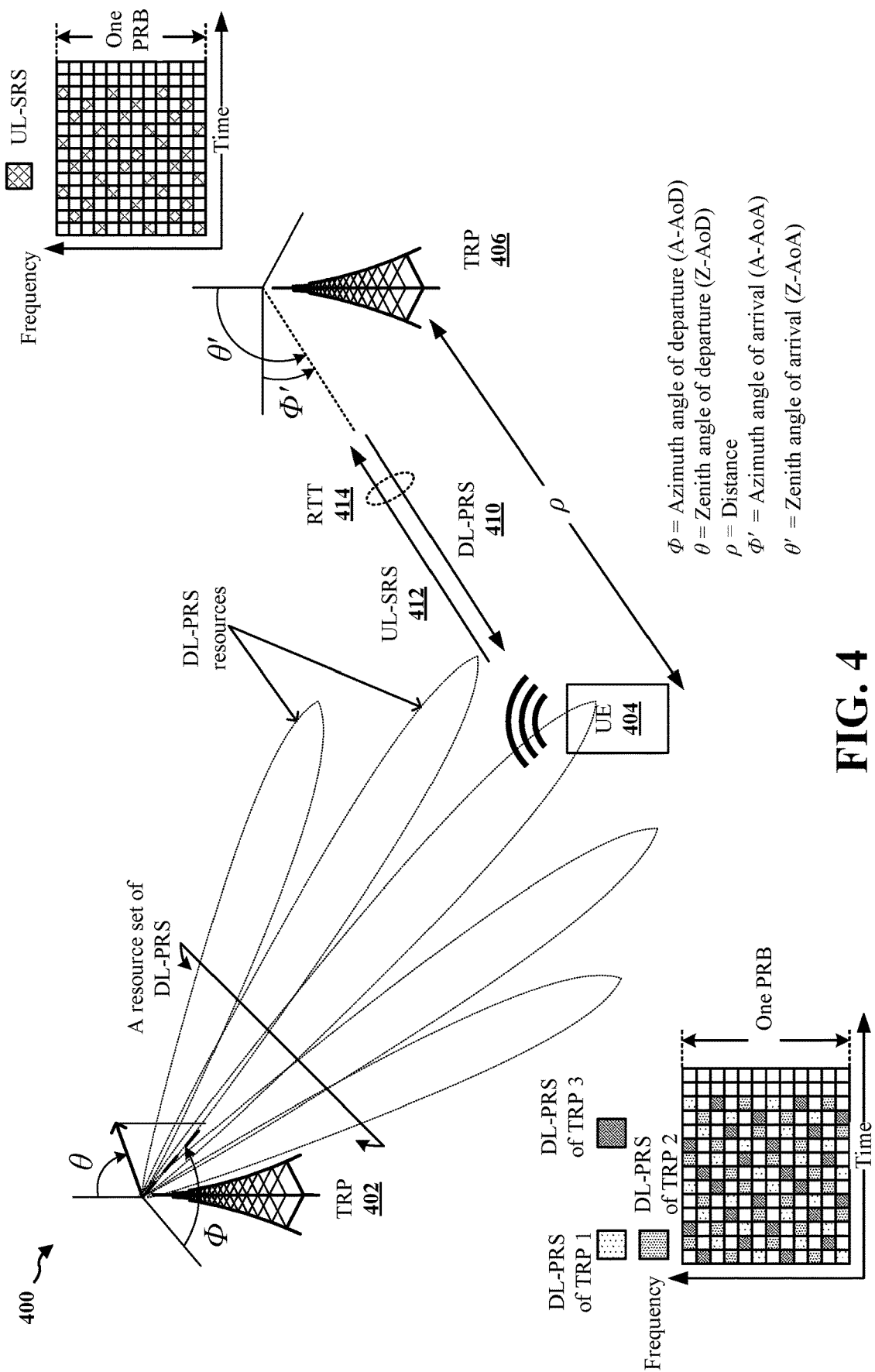
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

A device (e.g., a UE) equipped with a global navigation satellite system (GNSS) receiver may determine its location based on reception of signals from multiple satellites, which may be referred to as "GNSS-based positioning" or "satellite-based positioning." GNSS is a network of satellites broadcasting timing and orbital information used for navigation and positioning measurements. In addition, GNSS may refer to the International Multi-Constellation Satellite System, which may include global positioning system (GPS), global navigation satellite system (GLONASS), Baidu, Galileo, and any other constellation system. GNSS may include multiple groups of satellites (which may be referred to as GNSS satellites), known as constellations, that broadcast signals (which may be referred to as GNSS signals) to control stations and users of the GNSS. Based on the broadcast signals, the users may be able to determine their locations (e.g., via a trilateration process). For purposes of the present disclosure, a device (e.g., a UE) that is equipped with a GNSS receiver or is capable of receiving GNSS signals may be referred to as a GNSS device, and a device that is capable of transmitting GNSS signals, such as a satellite, may be referred to as a space vehicle (SV).

Figure 5:
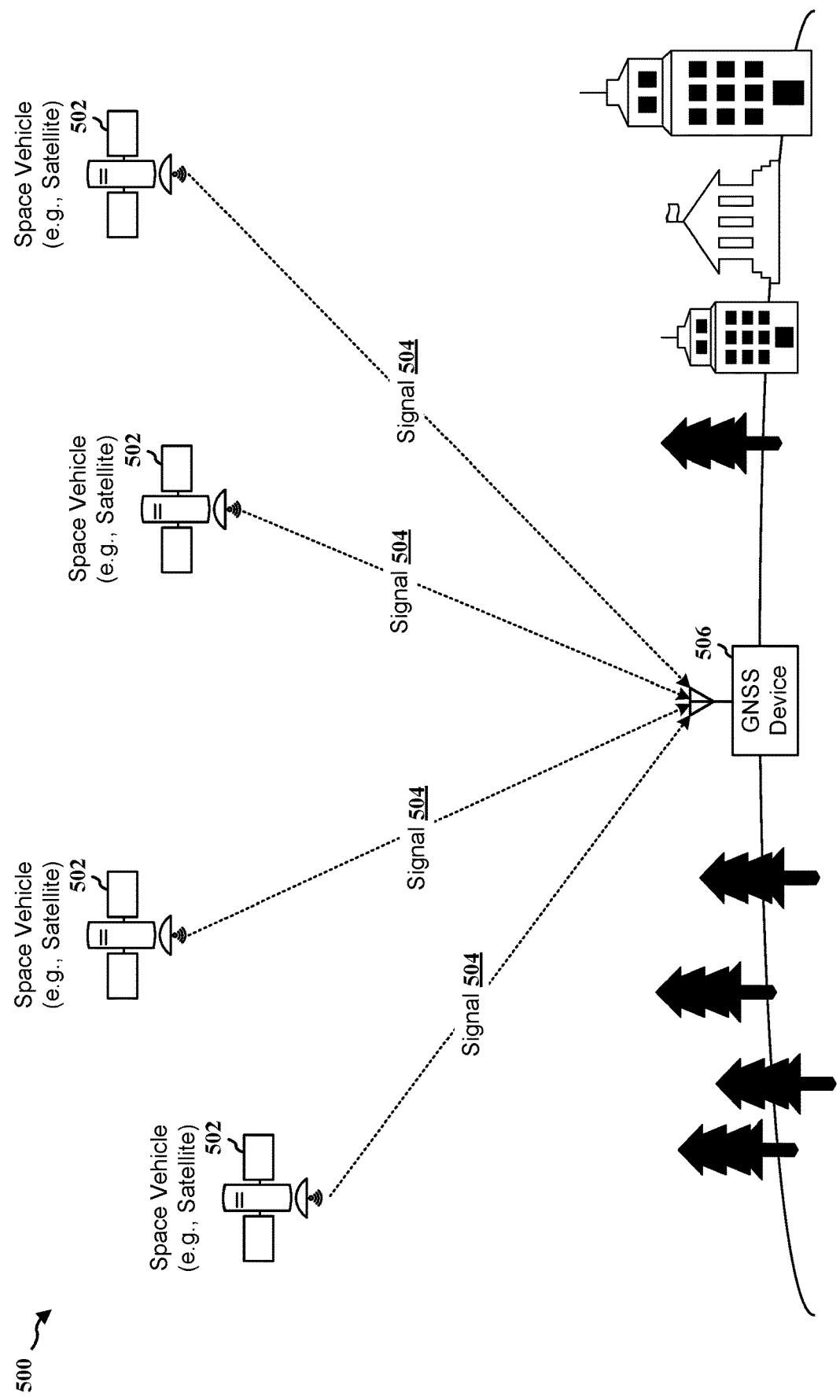
FIG. 5 is a diagram illustrating an example of global navigation satellite system (GNSS) positioning in accordance with various aspects of the present disclosure.

FIG. 5 is a diagram 500 illustrating an example of GNSS positioning in accordance with various aspects of the present disclosure. A GNSS device 506 may calculate its position and time based at least in part on data (e.g., GNSS signals 504) received from multiple space vehicles (SVs) 502, where each SV 502 may carry a record of its position and time and may transmit that data (e.g., the record) to the GNSS device 506. Each SV 502 may further include a clock that is synchronized with other clocks of SVs and with ground clock(s). If an SV 502 detects that there is a drift from the time maintained on the ground, the SV 502 may correct it. The GNSS device 506 may also include a clock, but the clock for the GNSS device 506 may be less stable and precise compared to the clocks for each SV 502.

As the speed of radio waves may be constant and independent of the satellite speed, a time delay between a time the SV 502 transmits a GNSS signal 504 and a time the GNSS device 506 receives the GNSS signal 504 may be proportional to the distance from the SV 502 to the GNSS device 506. In some examples, a minimum of four SVs may be used by the GNSS device 506 to compute/calculate one or more unknown quantities associated with positioning (e.g., three position coordinates and clock deviation from satellite time, etc.).

Each SV 502 may broadcast the GNSS signal 504 (e.g., a carrier wave with modulation) continuously that may include a pseudorandom code (e.g., a sequence of ones and zeros) which may be known to the GNSS device 506, and may also include a message that includes a time of transmission and the SV position at that time. In other words, each GNSS signal 504 may carry two types of information: time and carrier wave (e.g., a modulated waveform with an input signal to be electromagnetically transmitted). Based on the GNSS signals 504 received from each SV 502, the GNSS device 506 may measure the time of arrivals (TOAs) of the GNSS signals 504 and calculate the time of flights (TOFs) for the GNSS signals 504. Then, based on the TOFs, the GNSS device 506 may compute its three-dimensional position and clock deviation, and the GNSS device 506 may determine its position on the Earth. For example, the GNSS device 506's location may be converted to a latitude, a longitude, and a height relative to an ellipsoidal Earth model. These coordinates may be displayed, such as on a moving map display, or recorded or used by some other system, such as a vehicle guidance system.

While the distance between a GNSS device and an SV may be calculated based on the time it takes for a GNSS signal to reach the GNSS device, the SV's signal sequence may be delayed in relation to the GNSS device's sequence. Thus, in some examples, a delay may be applied to the GNSS device's sequence, such that the two sequences are aligned. For example, to calculate the delay, a GNSS device may align a pseudorandom binary sequence contained in the SV's signal to an internally generated pseudorandom binary sequence. As the SV's GNSS signal takes time to reach the GNSS device, the SV's sequence may be delayed in relation to the GNSS device's sequence. By increasingly delaying the GNSS device's sequence, the two sequences may eventually be aligned.

Ultrawide band (UWB) may refer to a wireless communication technology that utilizes a wide spectrum of radio frequencies to communicate (e.g., to transmit/receive data). For example, a UWB capable device (e.g., a UE) may operate by transmitting very short and low-power pulses of radio waves across a wide frequency band, typically spanning several GHz. These pulses may be configured to be brief and spread out across a wide range of frequencies so that they are less likely to interfere with other wireless devices or most (conventional/existing) radio communication systems. Example characteristics and features of UWB technology may include:

(1) Wide Frequency Bandwidth: UWB devices may use a frequency bandwidth that is significantly wider than most wireless technologies such as Wi-Fi® and/or Bluetooth®.

(2) Short Pulses: UWB devices may transmit data using extremely short pulses (e.g., in nanoseconds or picoseconds) with high data rates, making them suitable for high-speed data transfer.

(3) Low Power: UWB transmitters typically use very low power, which may help reduce the risk of interference with other wireless technologies and extends battery life in UWB devices.

(4) Precision Location and Tracking: UWB technology may be capable of providing highly accurate location and tracking information. It may be used in applications such as indoor positioning, asset tracking, and/or precise localization (e.g., for autonomous vehicles).

(5) High Data Rates: UWB may support high data transfer rates, making it suitable for applications such as wireless USB connections, streaming high-definition video, and other high-bandwidth data transfers.

(6) Impulse Radio: UWB often uses impulse radio techniques, where data is encoded in the time domain rather than the frequency domain, further reducing interference and providing robustness in harsh radio environments.

(7) Low Interference: Due to its short pulses and low power, UWB is less likely to interfere with other wireless technologies, and it may coexist with other wireless systems.

A wireless device (e.g., a UE, a mobile phone, etc.) may be implemented with both the GNSS technology and the UWB technology, where the wireless device may have the capability to perform both the GNSS-based positioning and the UWB communication (including performing them simultaneously or at least partially overlapping in time). In some examples, the GNSS technology (e.g., a GNSS receiver/device) and the UWB technology (e.g., a UWB transceiver/device) may be allocated on a same chipset in a wireless device, while in other examples, they may be allocated on different chipsets/devices. However, though UWB and GPS technologies/devices are designed to operate at different frequency bands, studies and experiments have found that UWB technologies/devices may still create interference with GNSS technologies/devices. Such interference may affect the performance (e.g., accuracy) of the GNSS technologies/devices, such as providing wrong location details.

Figure 6:
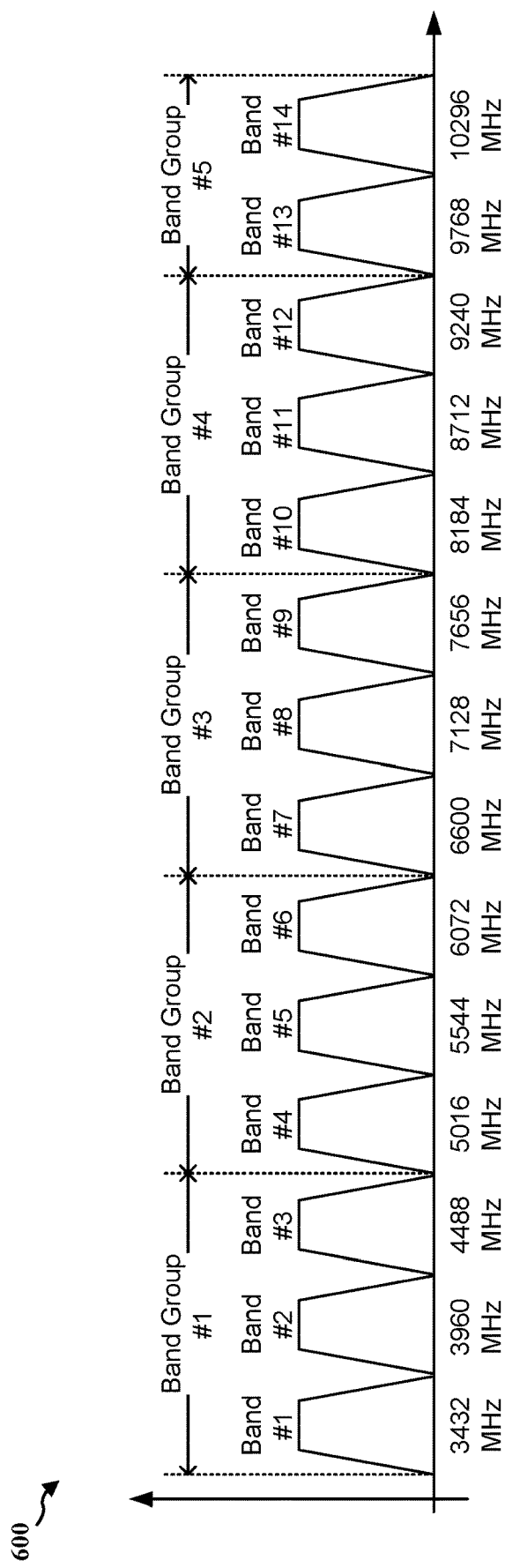
FIG. 6 is a diagram illustrating an example operating bandwidth for ultrawide band (UWB) in accordance with various aspects of the present disclosure.

FIG. 6 is a diagram 600 illustrating an example operating bandwidth for UWB in accordance with various aspects of the present disclosure. In some implementations, a UWB physical layer may be configured to utilize the unlicensed frequency band between 3.1 to 10.6 GHz, which may support data rates of 53.3, 80, 106.7, 160, 200, 320, 400, and 480 Mb/s. In addition, as shown by the diagram 600, a UWB spectrum may be divided into 14 bands, where each band may have a bandwidth of 528 MHz. The first 12 bands (e.g., band #1 to band #12) may be grouped into four band groups (e.g., band group #1 to band group #4) consisting of three bands, while the last two bands (e.g., band #13 and band #14) may be grouped into a fifth band group (e.g., band group #5). Some implementations may specify a UWB device to support at least the first band group. In some examples, a total of 100 data sub-carriers may be used per band to transmit the data.

Figure 7:
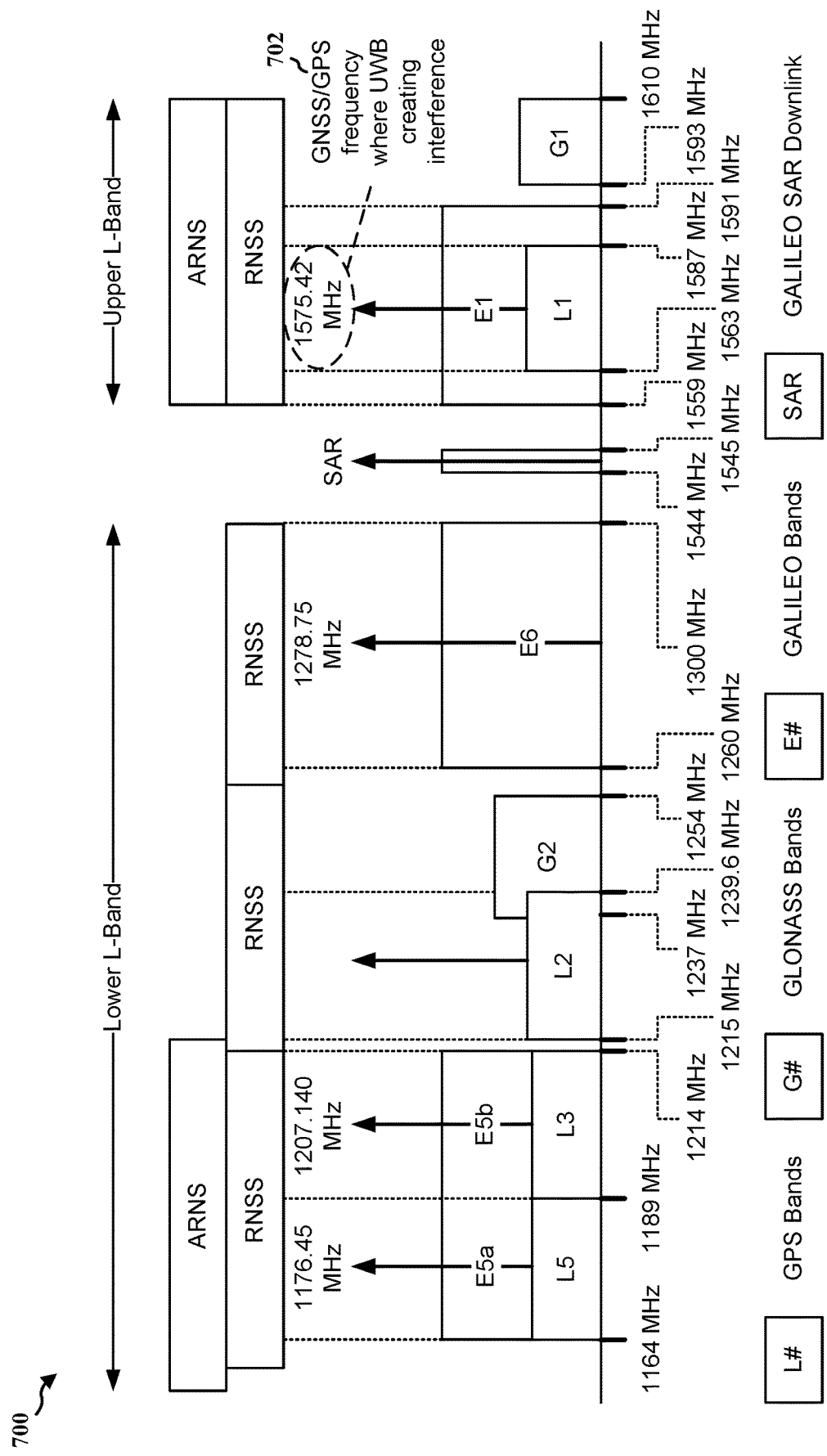
FIG. 7 is a diagram illustrating an example navigational frequency band for GNSS in accordance with various aspects of the present disclosure.

FIG. 7 is a diagram 700 illustrating an example navigational frequency band for GNSS (e.g., GPS, GLONASS, and Galileo, which may also be referred to as Radio Navigation Satellite System (RNSS)) in accordance with various aspects of the present disclosure. There may be two bands in the region allocated to the Aeronautical Radio Navigation Service (ARNS) on a primary basis worldwide, where these bands may be suitable for Safety-of-Life applications as other users may not be allowed to interfere with their signals. They may correspond to an upper L-band (e.g., 1559-1610 MHz), having the GPS L1, Galileo E1 and GLONASS G1, and to the bottom of a lower L-band (e.g., 1151-1214 MHz) where GPS L5 and Galileo E5 are located, with E5a and L5 coexisting in the same frequencies. The remaining GPS L2, GLONASS G2 and Galileo E6 signals are in the bands 1215.6-1350 MHz. These bands may be allocated to radio-location services (e.g., ground radars) and RNSS on a primary basis, hence the signals in these bands may be more vulnerable to interference compared to the previous ones.

As shown at 702, when a GNSS (e.g., a GPS) satellite is operating under the L1 band (e.g., at the center frequency of 1575.42 MHz), an UWB device/communication may create an interference to the reception of the GNSS signal. In other words, when a wireless device is performing GNSS-based positioning under the L1 band and is also performing the UWB communication (simultaneously or at least partially overlapping in time), the UWB communication may cause interference to the reception of GNSS signal even though they are at different frequency bands as shown by FIGS. 6 and 7.

As described above, UWB is one of emerging protocols in transferring data for short ranges by using low power simultaneously. On the other hand, the landing level of a GNSS signal may be very weak, and may make it very susceptible to interference from the surrounding electromagnetic environment. When a receiver-related processor (e.g., a processor coupled to both a GNSS receiver and a UWB transceiver/receiver) leaks a strong pulse in a UWB signal and is mixed into a GNSS signal, it may pose a great threat to the performance of the receiver (e.g., the GNSS receiver). As such, improved ways to effectively reduce interference for GNSS receivers when there is nearby UWB device(s) may be specified, such as when the GNSS receiver chipset and the UWB transceiver chipset are collocated or in proximity to each other.

In some experiments/simulations performed in association with the present disclosure, a time-hopping pulse position modulation (TH-PPM) UWB system was shown to affect GNSS signals, where the experiments/simulations took/used parameters such as a UWB pulse signal width of 0.5 nanoseconds (ns), an amplitude of the second-order Gaussian pulse of 1 V, a time shift introduced by pulse position modulation (PPM) of 0.5 ns, and the number of UWB pulses (Np) transmitted for each data symbol is configured to be 10. A pulse repetition frequency (PRF) may refer to a rate at which pulses are transmitted by a UWB transmitter/transceiver. In other words, the PRF may be defined as the number of pulses transmitted per unit of time (e.g., measured in hertz (Hz) or pulses per second (PPS)). A higher PRF may indicate that pulses are transmitted more frequently, while a lower PRF may indicate that pulses are transmitted less frequently. The PRF may be an important parameter in UWB systems and may play a crucial role in determining the UWB systems' performance and capabilities.

Figure 8A:
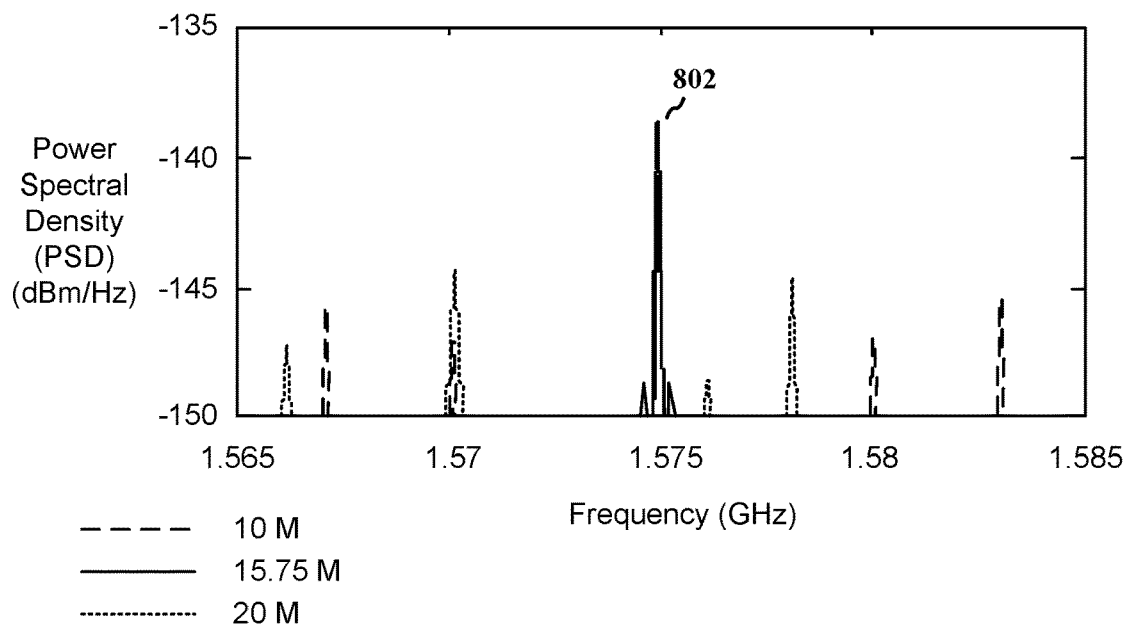
FIG. 8A is a diagram illustrating an example of power spectral density (PSD) for various pulse repetition frequencies (PRFs) in accordance with various aspects of the present disclosure.
Figure 8B:
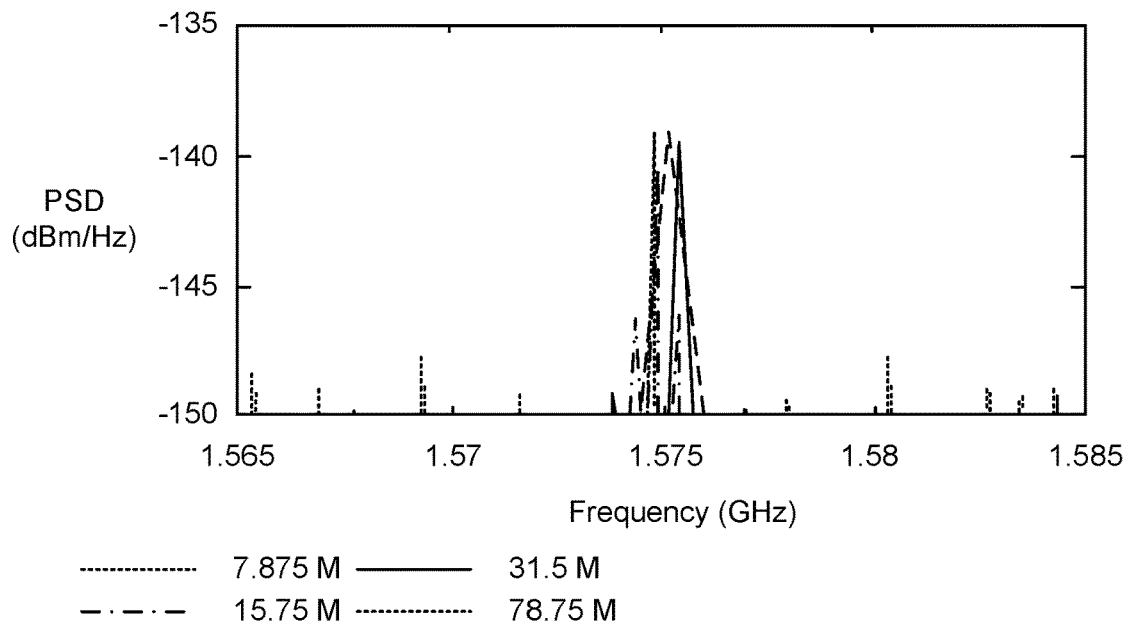
FIG. 8B is a diagram illustrating an example of PSD for various PRFs in accordance with various aspects of the present disclosure.

The experiments/simulations took three different groups of pulse repetition frequency (PRF): the first group of PRF is 10 MHz (e.g., PRF1=10 MHz), the second group of PRF is 15.75 MHz (e.g., PRF2=15.75), the third group of PRF is 20 MHz (e.g., PRF3=20 MHz), and a GPS L1 carrier center frequency ($f_0$) of 1575.42 MHz (e.g., $f_0$=1575.42 MHz) for the experiments/simulations. Within a 20 MHz bandwidth of the L1 carrier center frequency (e.g., 1.565 GHz to 1.585 GHz), the frequency domain relationship of three UWB signal spectral lines under different PRFs appears to be fitted, as shown by a diagram 800A of FIG. 8A. When the PRF is equal to 15.75 MHz (e.g., PRF=15.75 MHz), its integer multiples are observed to fall at the GPS carrier center frequency, and there appears to be an obvious spectral energy spike that coincides with the GPS L1 main lobes, such as shown at 802, which may be easily mixed into the acquisition and tracking process through a receiver front-end filter, and may effectively reduce the satellite signal (e.g., interfere the reception of the GNSS signal). The experiments/simulations also demonstrate example impact of the UWB signal when the PRF integer multiples fall in the working bandwidth of the GPS signal while keeping other parameters the same, where the UWB PRF was simulated at 7.875 MHz, 15.75 MHz, 31.5 MHz, and 78.75 MHz. The PSD of the UWB signal in the GPS operating frequency band is shown by a diagram 800B of FIG. 8B.

Aspects presented herein may enable a wireless device to reduce interference to GNSS receiver(s) when there is a nearby UWB device/chipset/transceiver. For example, aspects presented herein may enable a wireless device that is capable of performing UWB communications or simultaneously performing both the GNSS-based positioning and the UWB communications (e.g., a wireless device that includes both GNSS receiver/chipset and UWB transceiver/chipset) to prevent the UWB communications from interfering (e.g., affecting/degrading) the performance of the GNSS-based positioning. In one aspect of the present disclosure, a wireless device that is capable of performing UWB communications (and optionally the GNSS-based positioning) may be configured to perform a dynamic selection of PRF based on the operating frequency of the GNSS receiver (e.g., when the GNSS receiver is operating under a specified frequency such as 1.575 GHz). For example, a UWB device (e.g., referring to the wireless device that is capable of performing the UWB communications) may be configured to perform an energy detection (ED) scan on GNSS channel(s) for a period of time to detect whether there is any GNSS signal(s) prior to performing an actual scan and/or establishing a connection (e.g., a UWB channel) with a peer UWB device. If the UWB device detects GNSS signal(s), the UWB device may be configured to select a PRF that does not have integral multiples of the detected GNSS signal(s) to avoid interfering with the GNSS receiver which it is operating on. For example, if the GNSS receiver is operating on 1.575 GHz, the UWB device may be configured to avoid selecting a PRF that has an integral multiple of 1.575 GHz (e.g., 7.875 MHz, 15.75 MHz, 31.5 MHz, 78.75 MHz, etc.). The UWB device may be specified to perform the ED scan periodically and even after connecting with a peer UWB peer on GNSS channel(s) to adopt different PRFs other than integral multiples of the GNSS receivers.

Figure 9:
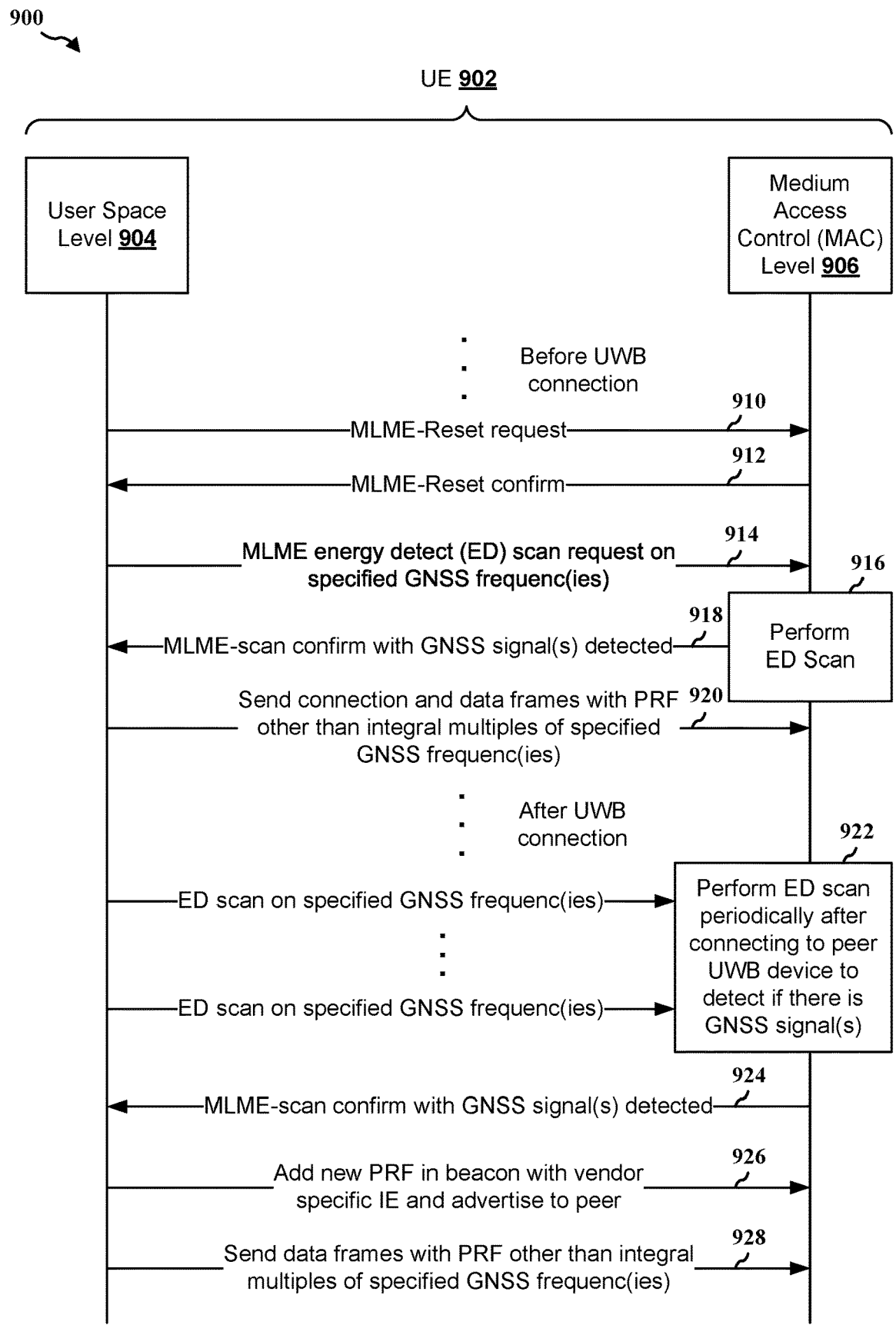
FIG. 9 is a communication flow illustrating an example signaling between a user space level and a medium access control (MAC) level (e.g., within a UE) for performing a dynamic selection of PRF based on operating frequency(ies) of GNSS receiver in accordance with various aspects of the present disclosure.

FIG. 9 is a communication flow 900 illustrating an example signaling between a user space level and a medium access control (MAC) level (e.g., of a UE) for performing the dynamic selection of PRF based on operating frequenc(ies) of GNSS receiver in accordance with various aspects of the present disclosure. The numberings associated with the communication flow 900 do not specify a particular temporal order and are merely used as references for the communication flow 900. For purposes of the present disclosure, in the context of wireless communication and/or network/operating systems, a "user space/user space layer/user space level" and "MAC/May layer/MAC level" may refer to different layers or levels in a communication/network stack with different (e.g., distinct) functions and characteristics. In some examples, a user space may level may refer to a part of a memory (e.g., the memory of a UE) where user applications run. The user space level may be a higher-level layer of an operating system stack. For example, user space programs may typically be executed by a processor and have access to system resources, such as memory and file system. User space applications may interact with an operating system's kernel through system calls, where these system calls may be used to request services or resources provided by the kernel, such as file input/output (I/O), network communication, and/or hardware access, etc. A MAC layer may refer to a layer that controls the hardware responsible for interaction with the wired (e.g., electrical or optical) or wireless transmission medium. For example, the MAC layer may provide flow control and multiplexing for the transmission medium.

In one aspect of the present disclosure, after a UE 902 (e.g., a wireless device capable of performing UWB communication, a UWB device, etc.) is turned on, or after its UWB communication protocols/functions are activated, the UE 902 may be configured to perform an energy detection (ED) scan. An ED scan may refer to scanning/measuring of energy in specified channel(s). For example, at 910, prior to the UE 902 establishing a UWB connection (e.g., with another UE which may be referred to as a peer UWB device), a user space level 904 of the UE 902 may transmit, to a MAC level 906 of the UE 902, a reset request message (e.g., a MAC sublayer management entity (MLME) reset request message) to request the MAC level 906 to perform a reset operation. At 912, in response to the request message, the MAC level 906 may perform the reset operation, and send a reset confirm message (e.g., an MLME reset confirm message) to the user space level 904 (e.g., to confirm the reset operation). The signaling described in connection with 910 and 912 may be specified in some implementations, and may be optional in other implementations.

At 914, the user space level 904 may transmit, to the MAC level 906, an ED scan request message (e.g., an MLME ED scan request message) to request the MAC level 906 to perform ED scan on specified GNSS frequenc(ies). For example, the ED scan request message may request the MAC level 906 to scan a GPS frequency on 1.575 GHz for a specified period of time (e.g., for five minutes, for ten minutes, or while the UWB communication is active, etc.). In some examples, the GNSS frequenc(ies) may also be referred to as GNSS center frequenc(ies). As such, the ED scan request message may include information elements (IEs) and/or configurable parameters related to GNSS frequenc(ies) to be scanned and the duration in which the ED scan is to be performed. The GNSS frequenc(ies) may be one or more frequencies within a specified GNSS band (e.g., one frequency or multiple frequencies between 1563 MHz to 1587 MHz for GPS L1) or a center frequency within a specified GNSS band (e.g., the center frequency of 1575 MHz for the GPS L1).

At 916, based on the ED scan request, the MAC level 906 may perform the ED scan on GNSS frequenc(ies) requested for the specified period of time. For example, the MAC level 906 may perform the ED scan on the GPS frequency 1.575 GHz for five minutes.

At 918, if energy is detected on GNSS frequenc(ies) requested during the specified period of time, the MAC level 906 may transmit, to the user space level 904, a scan confirmation message (e.g., an MLME scan confirmation message) that includes indication(s) of the GNSS signal(s) detected. For example, if the MAC level 906 detects the GPS frequency 1.575 GHz during the ED scan, the MAC level 906 may transmit a scan confirmation message to the user space level 904 indicating that the GPS frequency 1.575 GHz has been detected. In some implementations, to determine whether the GNSS signal(s) or frequenc(ies) are detected, the UE 902 may be configured to compare the detected/measured energy against an energy threshold (e.g., detected/measured energy that is above the energy threshold will be counted/considered as a valid detection).

At 920, based on the indication(s) of the GNSS signal(s) detected, to reduce interference levels at a GNSS receiver (which may or may not allocated with the UE 902), the user space level 904 may indicate UWB associated firmware and/or hardware (e.g., via a UWB driver) to use PRF(s) that do not have integer multiples matching the GNSS frequenc(ies) requested (if the PRF(s) for the UWB communication have not been configured), or the user space level 904 may indicate the UWB associated firmware and/or hardware to change to PRF(s) that do not have integer multiples matching the GNSS frequenc(ies) requested (if the PRF(s) for the UWB communication have been configured and include at least one PRF with an integer multiple matching the GNSS frequenc(ies) requested). For example, to avoid interfering with the GPS frequency 1.575 GHz, the user space level 904 may indicate to the UWB associated firmware and/or hardware not to use PRF of 7.875 MHz (or to use PRF(s) other than 7.875 MHz) as this frequency is an integral multiple of 1.575 GHz (e.g., 7.875 MHz*200=1.575 GHz). For purposes of the present disclosure, an integral multiple of a specified frequency may refer to any frequencies that are multiples of the specified frequency. For example, integral multiples of frequency (f)=N*f where N is an integer (1, 2, 3, 4, . . . , etc.). In addition, at 920, the user space level 904 may also send UWB communications (which may also be referred to as UWB frames) to other UE(s) (e.g., the peer UWB device(s)). For example, the user space level 904 may send, to the MAC level 906, UWB connection and data frames with PRF other than integral multiples of specified GNSS frequenc(ies).

On the other hand, at 916, if the ED scan does not detect any energy for GNSS frequenc(ies) specified (e.g., the GNSS energy(ies) are not detected), then the user space level 904 (or the UE 902) may operate the UWB communication with any PRF(s) (e.g., irrespective to integral multiples of 7.875 MHz).

In some implementations, at 922, the UE 902 (or the MAC level 906) may be configured to perform the ED scan periodically on requested GNSS frequenc(ies) even after the UE 902 has established a UWB communication with another UE (e.g., after the UE 902 is connected with another peer UWB device), and to adopt different PRF(s) when requested GNSS signal(s) are detected and are integral multiples of the PRF(s) used. Such scenario may occur when the UE 902 has established a UWB connection with a peer UWB device first (e.g., based on a UWB communication request), and then the UE 902 (or another GNSS device) is configured to perform GNSS-based positioning (e.g., based on a subsequent positioning request). For example, if requested GNSS frequenc(ies) are detected, at 924, the MAC level 906 may transmit, to the user space level 904, a scan confirmation message that includes indication(s) of the GNSS signal(s) detected. Then, the user space level 904 may indicate UWB associated firmware and/or hardware (e.g., via a UWB driver) to use or to change to PRF(s) that do not have integer multiples matching the GNSS frequenc(ies) requested.

In another aspect of the present disclosure, at 926, when requested GNSS frequenc(ies) are detected, the UE 902 may also be configured to transmit (e.g., advertise, broadcast, unicast, etc.) PRF(s) to be used or not to be used for the UWB communication. As such, peer UWB device(s) communicating with the UE 902 may also avoid transmitting UWB communications using PRF(s) that have integral multiples matching the GNSS frequenc(ies) requested. For example, the UE 902 may add a new PRF (e.g., a PRF to be used or not to be used) in a beacon with a specified IE (e.g., a vendor specific IE) to advertise the new PRF to peer UWB device(s).

FIG. 10A is a diagram 1000A illustrating an example of a beacon frame format in accordance with various aspects of the present disclosure. A beacon frame may refer to one of the management frames for wireless communication. A beacon frame may include various information about the wireless communication (and/or about its transmitter). In some implementations, beacon frames may be configured to be transmitted periodically, and may serve to announce the presence of a wireless device.

FIG. 10B is a diagram 1000B illustrating an example of an enhanced beacon frame format in accordance with various aspects of the present disclosure. Enhanced beacon frames may provide additional features and capabilities compared to the beacon frames as shown by FIG. 10A (which may be referred to as standard beacon frames). For example, enhanced beacon frames may include more detailed information about the network, such as basic service set (BSS) number of connected clients, channel utilization, and other metrics, etc. As shown at 1002, in one example, the UE 902 may use the header IEs to indicate PRF values to be used or not to be used for UWB communication to other peer UWB device(s).

FIG. 11A is a diagram 1100A illustrating an example of a header IE format in accordance with various aspects of the present disclosure. As shown at 1102, the element ID may be configured to be zero (0) for specified header IE (e.g., for vendor specific header IE).

FIG. 11B is a diagram 1100B illustrating an example of element IDs for header IEs in accordance with various aspects of the present disclosure. As shown at 1104, some network standards may enable vendor specific header IE(s) to be used in enhanced beacon frames.

Referring back to FIG. 9, at 928, after the UE 902 transmits (e.g., advertises, broadcasts, unicasts, etc.) PRF(s) to be used or not to be used (e.g., via a beacon using specified IE(s)), the user space level 904 may send, via the MAC level 906, UWB communications (e.g., UWB frames) to other UE(s)/peer UWB device(s) with PRF(s) other than integral multiples of specified GNSS frequenc(ies) such as described in connection with 920.

In some implementations, if the UE 902 is capable of performing both the UWB communication and the GNSS-based positioning (e.g., the GNSS frequenc(ies) requested to be detected/monitored are associated with the GNSS-based positioning performed by the UE 902), the UE 902 may be configured to calculate its position based on the GNSS signals detected. In other words, the GNSS signals received for the ED scan purpose is also used for the positioning. As such, after the UE 902 selects PRF(s) for the UWB communication(s) that do not have integral multiples of the GNSS frequenc(ies), the UE 902 may perform both the UWB communication(s) and the GNSS-based positioning simultaneously or at least partially overlapping in time. For example, the UE 902 may perform the UWB communication via a UWB transceiver (e.g., transmit UWB data and/or receive UWB data), and perform the GNSS-based communication via a GNSS receiver. Depending on the design or the implementations, the UWB transceiver and the GNSS receiver may be configured to be on the same chipset.

Aspects presented herein are directed to techniques for reducing UWB signal interference with GPS/GNSS receiver. At the high level, UWB device will perform ED scan on GPS frequency/channel (1.575 GHz) to detect if there are GPS signals before performing actual scan and connect with peer UWB devices. The proposed solution includes the following steps/operations: 1. After turning ON UWB device, perform ED scan on 1.575 GHz GPS frequency for a specific period of time which is configurable in ED scan request. 2. If GPS energy is detected, scan confirmation response will be received to the MAC. 3. Now to reduce interference levels at GPS receiver, UWB driver will indicate firmware and hardware to change the PRF's to other than integral multiples of 7.875 MHz, while sending UWB frames to peer device. 4. If GPS energy in not detected, device under test (DUT) acting as UWB device will operates PRF with irrespective to integral multiples of 7.875 Mhz. 5. The same ED scan specifies to be performed periodically even after connecting with UWB peer device on GPS frequency 1.575 GHz to adopt different PRFs other than integral multiples of 7.875 MHz when GPS signal is detected. Aspects presented herein may enable a UWB device to generate less noise to other wireless devices like GPS. In addition, no extra radio is specified to implement the techniques described herein (e.g., for detecting the GNSS signals). Thus, hardware (HW) complexity may not be increased. In addition, there may be no passive or active scan specified for detecting GPS signal as ED scan is used.

Figure 12:
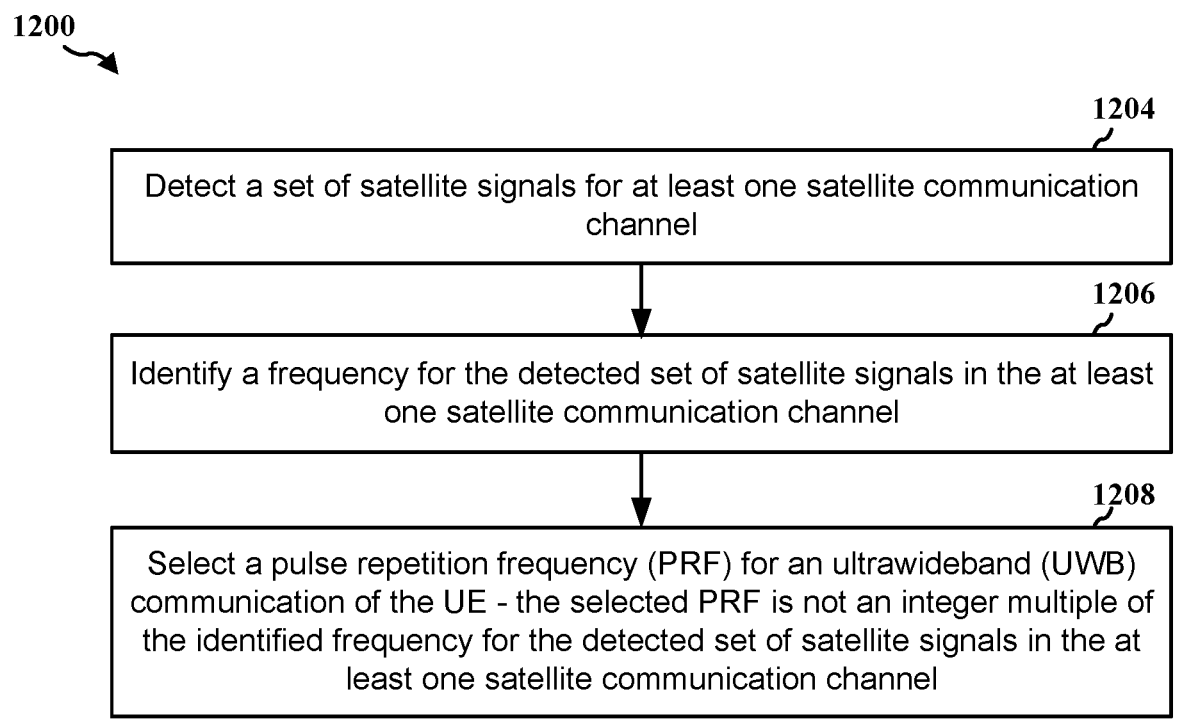
FIG. 12 is a flowchart of a method of wireless communication.

FIG. 12 is a flowchart 1200 of wireless communication at a user equipment (UE). The method may be performed by a UE (e.g., the UE 104, 404, 902; the GNSS device 506; the apparatus 1404). The method may enable the UE to reduce interference to GNSS receiver(s) when the UE is performing UWB communication(s).

At 1204, the UE may detect a set of satellite signals for at least one satellite communication channel, such as described in connection with FIG. 9. For example, as discussed in connection with 916, based on the ED scan request, the MAC level 906 of the UE 902 may perform the ED scan on GNSS frequenc(ies) requested for the specified period of time. The detection of the set of satellite signals may be performed by, e.g., the dynamic PRF selection component 198, the SPS module 1416, the UWB module 1438, the transceiver(s) 1422, the cellular baseband processor(s) 1424, and/or the application processor(s) 1406 of the apparatus 1404 in FIG. 14.

At 1206, the UE may identify a frequency for the detected set of satellite signals in the at least one satellite communication channel, such as described in connection with FIG. 9. For example, as discussed in connection with 918, if energy is detected on GNSS frequenc(ies) requested during the specified period of time, the MAC level 906 of the UE 902 may transmit, to the user space level 904, a scan confirmation message (e.g., an MLME scan confirmation message) that includes indication(s) of the GNSS signal(s) detected. The identification of the frequency for the detected set of satellite signals may be performed by, e.g., the dynamic PRF selection component 198, the SPS module 1416, the UWB module 1438, the transceiver(s) 1422, the cellular baseband processor(s) 1424, and/or the application processor(s) 1406 of the apparatus 1404 in FIG. 14. In some implementations, the frequency for the detected set of satellite signals may a frequency for the detected set of satellite signals.

At 1208, the UE may select a PRF for a UWB communication of the UE, where the selected PRF is not an integer multiple of the identified frequency for the detected set of satellite signals in the at least one satellite communication channel, such as described in connection with FIG. 9. For example, as discussed in connection with 920, based on the indication(s) of the GNSS signal(s) detected, to reduce interference levels at a GNSS receiver, the user space level 904 of the UE 902 may indicate UWB associated firmware and/or hardware (e.g., via a UWB driver) to use or to change to PRF(s) that do not have integer multiples matching the GNSS frequenc(ies) requested. The selection of the PRF for the UWB communication may be performed by, e.g., the dynamic PRF selection component 198, the SPS module 1416, the UWB module 1438, the transceiver(s) 1422, the cellular baseband processor(s) 1424, and/or the application processor(s) 1406 of the apparatus 1404 in FIG. 14.

In one example, the UE may transmit, to an entity participating in the UWB communication, the selected PRF for the UWB communication, such as described in connection with FIG. 9. For example, as discussed in connection with 926, the UE 902 may also be configured to transmit/broadcast PRF(s) to be used or not to be used for the UWB communication. The transmission of the selected PRF for the UWB communication may be performed by, e.g., the dynamic PRF selection component 198, the SPS module 1416, the UWB module 1438, the transceiver(s) 1422, the cellular baseband processor(s) 1424, and/or the application processor(s) 1406 of the apparatus 1404 in FIG. 14.

In another example, the UE may perform the UWB communication based on the selected PRF, and receive the detected set of satellite signals, where the performance of the UWB communication and the reception of the detected set of satellite signals are simultaneous or at least partially overlapping in time, such as described in connection with FIG. 9. For example, after the UE 902 selects PRF(s) for the UWB communication(s) that do not have integral multiples of the GNSS frequenc(ies), the UE 902 may perform both the UWB communication(s) and the GNSS-based positioning simultaneously. The UWB communication may be performed by, e.g., the dynamic PRF selection component 198, the SPS module 1416, the UWB module 1438, the transceiver(s) 1422, the cellular baseband processor(s) 1424, and/or the application processor(s) 1406 of the apparatus 1404 in FIG. 14.

In another example, the UE may calculate a position of the UE based on the reception of the detected set of satellite signals, such as described in connection with FIG. 9. For example, if the UE 902 is capable of performing both the UWB communication and the GNSS-based positioning (e.g., the GNSS frequenc(ies) requested to be detected/monitored are associated with the GNSS-based positioning performed by the UE 902), the UE 902 may be configured to calculate its position based on the GNSS signals detected. The calculation of the position of the UE may be performed by, e.g., the dynamic PRF selection component 198, the SPS module 1416, the UWB module 1438, the transceiver(s) 1422, the cellular baseband processor(s) 1424, and/or the application processor(s) 1406 of the apparatus 1404 in FIG. 14.

In another example, to perform the UWB communication, the UE may perform the UWB communication via a UWB transceiver, and to receive the detected set of satellite signals, the UE may receive the detected set of satellite signals via a satellite signal receiver. In some implementations, the UWB transceiver and the satellite signal receiver may be within a same chipset.

In another example, the UE may receive, prior to the performance of the UWB communication, a first request to perform the UWB communication, and receive a second request to calculate a position of the UE, such as described in connection with FIG. 9. For example, as discussed in connection with 922, the UE 902 (or the MAC level 906) may be configured to perform the ED scan periodically on requested GNSS frequenc(ies) even after the UE 902 has established a UWB communication with another UE (e.g., after the UE 902 is connected with another peer UWB device), and to adopt different PRF(s) when requested GNSS signal(s) are detected and are integral multiples of the PRF(s) used. Such scenario may occur when the UE 902 has established a UWB connection with a peer UWB device first (e.g., based on a UWB communication request), and then the UE 902 (or another GNSS device) is configured to perform GNSS-based positioning (e.g., based on a subsequent positioning request). The reception of the request may be performed by, e.g., the dynamic PRF selection component 198, the SPS module 1416, the UWB module 1438, the transceiver(s) 1422, the cellular baseband processor(s) 1424, and/or the application processor(s) 1406 of the apparatus 1404 in FIG. 14.

In another example, to detect the set of satellite signals for the at least one satellite communication channel, the UE may perform an energy detection (ED) scan on the at least one satellite communication channel for a specified period of time, and detect, based on the ED scan, the set of satellite signals based on an energy level for the set of satellite signals being above an energy threshold.

In another example, the UWB communication may include at least one of a UWB transmission or a UWB reception.

In another example, the set of satellite signals may be a set of global positioning system (GPS) signals or a set of global navigation satellite system (GNSS) signals.

In another example, the UE may detect that the set of satellite signals for the at least one satellite communication channel is no longer available, and select a second PRF for the UWB communication irrespective of the frequency of the set of satellite signals.

In another example, the UE may detect that the set of satellite signals for the at least one satellite communication channel is no longer available, and select the integer multiple of the identified frequency for the UWB communication.

In another example, the UE may transmit, to at least one second UE, an indication of the selected PRF for the UWB communication. In some implementations, to transmit the indication of the selected PRF for the UWB communication, the UE may broadcast, unicast, or advertise the indication of the selected PRF for the UWB communication via a beacon message or a beacon message format.

In another example, the UE may detect a second set of satellite signals for at least one second satellite communication channel, identify a second frequency for the detected second set of satellite signals in the at least one second satellite communication channel, and select a second PRF for the UWB communication of the UE, where the selected PRF is neither the integer multiple of the identified frequency nor the identified second frequency.

In another example, the UE may output an indication of the selected PRF for the UWB communication of the UE. In some implementations, to output the indication of the selected PRF for the UWB communication of the UE, the UE may transmit the indication of the selected PRF for the UWB communication of the UE, or store the indication of the selected PRF for the UWB communication of the UE.

Figure 13:
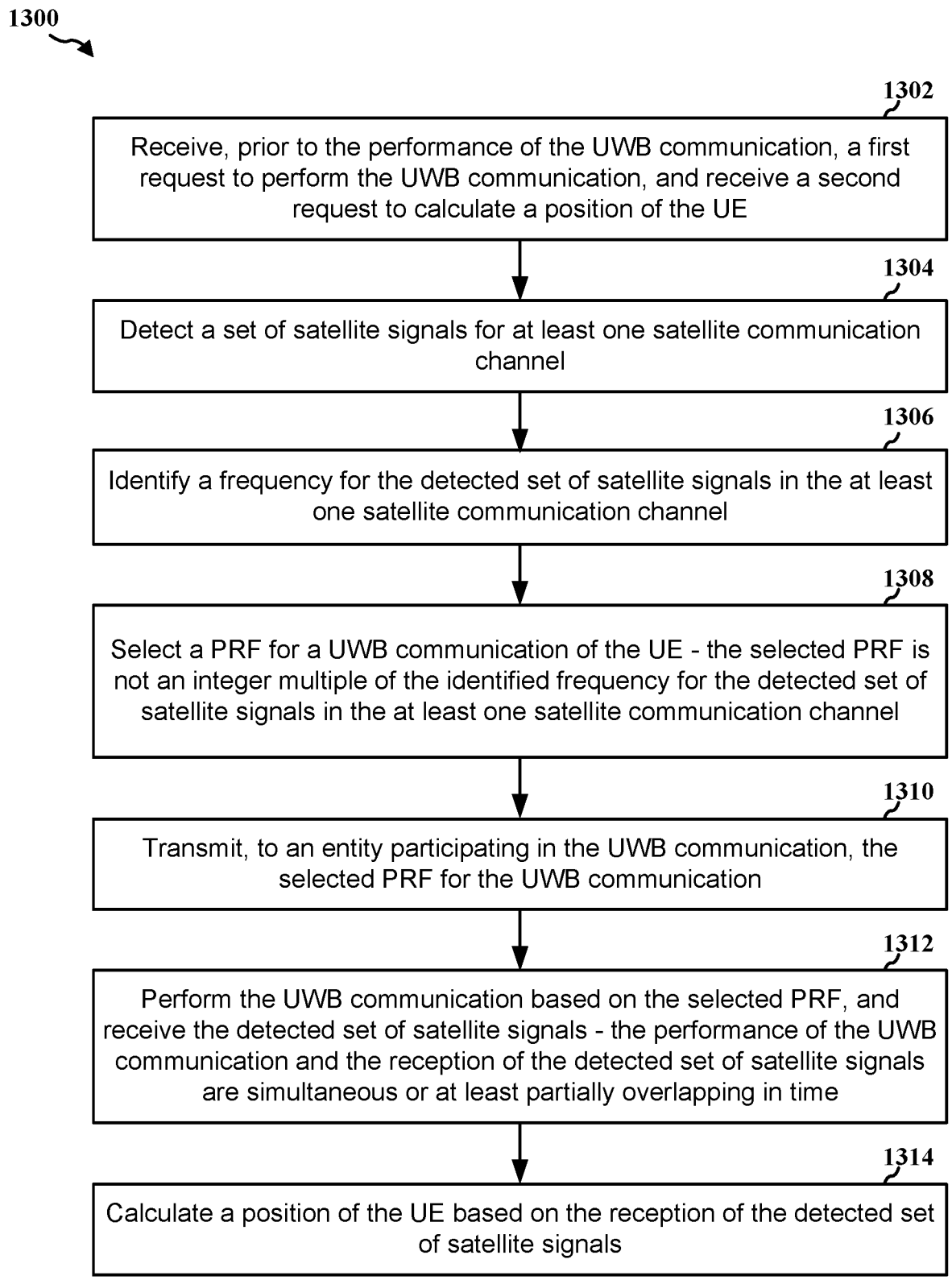
FIG. 13 is a flowchart of a method of wireless communication.

FIG. 13 is a flowchart 1300 of wireless communication at a user equipment (UE). The method may be performed by a UE (e.g., the UE 104, 404, 902; the GNSS device 506; the apparatus 1404). The method may enable the UE to reduce interference to GNSS receiver(s) when the UE is performing UWB communication(s).

At 1304, the UE may detect a set of satellite signals for at least one satellite communication channel, such as described in connection with FIG. 9. For example, as discussed in connection with 916, based on the ED scan request, the MAC level 906 of the UE 902 may perform the ED scan on GNSS frequenc(ies) requested for the specified period of time. The detection of the set of satellite signals may be performed by, e.g., the dynamic PRF selection component 198, the SPS module 1416, the UWB module 1438, the transceiver(s) 1422, the cellular baseband processor(s) 1424, and/or the application processor(s) 1406 of the apparatus 1404 in FIG. 14.

At 1306, the UE may identify a frequency for the detected set of satellite signals in the at least one satellite communication channel, such as described in connection with FIG. 9. For example, as discussed in connection with 918, if energy is detected on GNSS frequenc(ies) requested during the specified period of time, the MAC level 906 of the UE 902 may transmit, to the user space level 904, a scan confirmation message (e.g., an MLME scan confirmation message) that includes indication(s) of the GNSS signal(s) detected. The identification of the frequency for the detected set of satellite signals may be performed by, e.g., the dynamic PRF selection component 198, the SPS module 1416, the UWB module 1438, the transceiver(s) 1422, the cellular baseband processor(s) 1424, and/or the application processor(s) 1406 of the apparatus 1404 in FIG. 14. In some implementations, the frequency for the detected set of satellite signals may a frequency for the detected set of satellite signals.

At 1308, the UE may select a PRF for a UWB communication of the UE, where the selected PRF is not an integer multiple of the identified frequency for the detected set of satellite signals in the at least one satellite communication channel, such as described in connection with FIG. 9. For example, as discussed in connection with 920, based on the indication(s) of the GNSS signal(s) detected, to reduce interference levels at a GNSS receiver, the user space level 904 of the UE 902 may indicate UWB associated firmware and/or hardware (e.g., via a UWB driver) to use or to change to PRF(s) that do not have integer multiples matching the GNSS frequenc(ies) requested. The selection of the PRF for the UWB communication may be performed by, e.g., the dynamic PRF selection component 198, the SPS module 1416, the UWB module 1438, the transceiver(s) 1422, the cellular baseband processor(s) 1424, and/or the application processor(s) 1406 of the apparatus 1404 in FIG. 14.

In one example, at 1310, the UE may transmit, to an entity participating in the UWB communication, the selected PRF for the UWB communication, such as described in connection with FIG. 9. For example, as discussed in connection with 926, the UE 902 may also be configured to transmit/broadcast PRF(s) to be used or not to be used for the UWB communication. The transmission of the selected PRF for the UWB communication may be performed by, e.g., the dynamic PRF selection component 198, the SPS module 1416, the UWB module 1438, the transceiver(s) 1422, the cellular baseband processor(s) 1424, and/or the application processor(s) 1406 of the apparatus 1404 in FIG. 14.

In another example, at 1312, the UE may perform the UWB communication based on the selected PRF, and receive the detected set of satellite signals, where the performance of the UWB communication and the reception of the detected set of satellite signals are simultaneous or at least partially overlapping in time, such as described in connection with FIG. 9. For example, after the UE 902 selects PRF(s) for the UWB communication(s) that do not have integral multiples of the GNSS frequenc(ies), the UE 902 may perform both the UWB communication(s) and the GNSS-based positioning simultaneously. The UWB communication may be performed by, e.g., the dynamic PRF selection component 198, the SPS module 1416, the UWB module 1438, the transceiver(s) 1422, the cellular baseband processor(s) 1424, and/or the application processor(s) 1406 of the apparatus 1404 in FIG. 14.

In another example, at 1314, the UE may calculate a position of the UE based on the reception of the detected set of satellite signals, such as described in connection with FIG. 9. For example, if the UE 902 is capable of performing both the UWB communication and the GNSS-based positioning (e.g., the GNSS frequenc(ies) requested to be detected/monitored are associated with the GNSS-based positioning performed by the UE 902), the UE 902 may be configured to calculate its position based on the GNSS signals detected. The calculation of the position of the UE may be performed by, e.g., the dynamic PRF selection component 198, the SPS module 1416, the UWB module 1438, the transceiver(s) 1422, the cellular baseband processor(s) 1424, and/or the application processor(s) 1406 of the apparatus 1404 in FIG. 14.

In another example, to perform the UWB communication, the UE may perform the UWB communication via a UWB transceiver, and to receive the detected set of satellite signals, the UE may receive the detected set of satellite signals via a satellite signal receiver. In some implementations, the UWB transceiver and the satellite signal receiver may be within a same chipset.

In another example, at 1302, the UE may receive, prior to the performance of the UWB communication, a first request to perform the UWB communication, and receive a second request to calculate a position of the UE, such as described in connection with FIG. 9. For example, as discussed in connection with 922, the UE 902 (or the MAC level 906) may be configured to perform the ED scan periodically on requested GNSS frequenc(ies) even after the UE 902 has established a UWB communication with another UE (e.g., after the UE 902 is connected with another peer UWB device), and to adopt different PRF(s) when requested GNSS signal(s) are detected and are integral multiples of the PRF(s) used. Such scenario may occur when the UE 902 has established a UWB connection with a peer UWB device first (e.g., based on a UWB communication request), and then the UE 902 (or another GNSS device) is configured to perform GNSS-based positioning (e.g., based on a subsequent positioning request). The reception of the request may be performed by, e.g., the dynamic PRF selection component 198, the SPS module 1416, the UWB module 1438, the transceiver(s) 1422, the cellular baseband processor(s) 1424, and/or the application processor(s) 1406 of the apparatus 1404 in FIG. 14.

In another example, to detect the set of satellite signals for the at least one satellite communication channel, the UE may perform an ED scan on the at least one satellite communication channel for a specified period of time, and detect, based on the ED scan, the set of satellite signals based on an energy level for the set of satellite signals being above an energy threshold.

In another example, the UWB communication may include at least one of a UWB transmission or a UWB reception.

In another example, the set of satellite signals may be a set of GPS signals or a set of GNSS signals.

In another example, the UE may detect that the set of satellite signals for the at least one satellite communication channel is no longer available, and select a second PRF for the UWB communication irrespective of the frequency of the set of satellite signals.

In another example, the UE may detect that the set of satellite signals for the at least one satellite communication channel is no longer available, and select the integer multiple of the identified frequency for the UWB communication.

In another example, the UE may transmit, to at least one second UE, an indication of the selected PRF for the UWB communication. In some implementations, to transmit the indication of the selected PRF for the UWB communication, the UE may broadcast, unicast, or advertise the indication of the selected PRF for the UWB communication via a beacon message or a beacon message format.

In another example, the UE may detect a second set of satellite signals for at least one second satellite communication channel, identify a second frequency for the detected second set of satellite signals in the at least one second satellite communication channel, and select a second PRF for the UWB communication of the UE, where the selected PRF is neither the integer multiple of the identified frequency nor the identified second frequency.

In another example, the UE may output an indication of the selected PRF for the UWB communication of the UE. In some implementations, to output the indication of the selected PRF for the UWB communication of the UE, the UE may transmit the indication of the selected PRF for the UWB communication of the UE, or store the indication of the selected PRF for the UWB communication of the UE.

Figure 14:
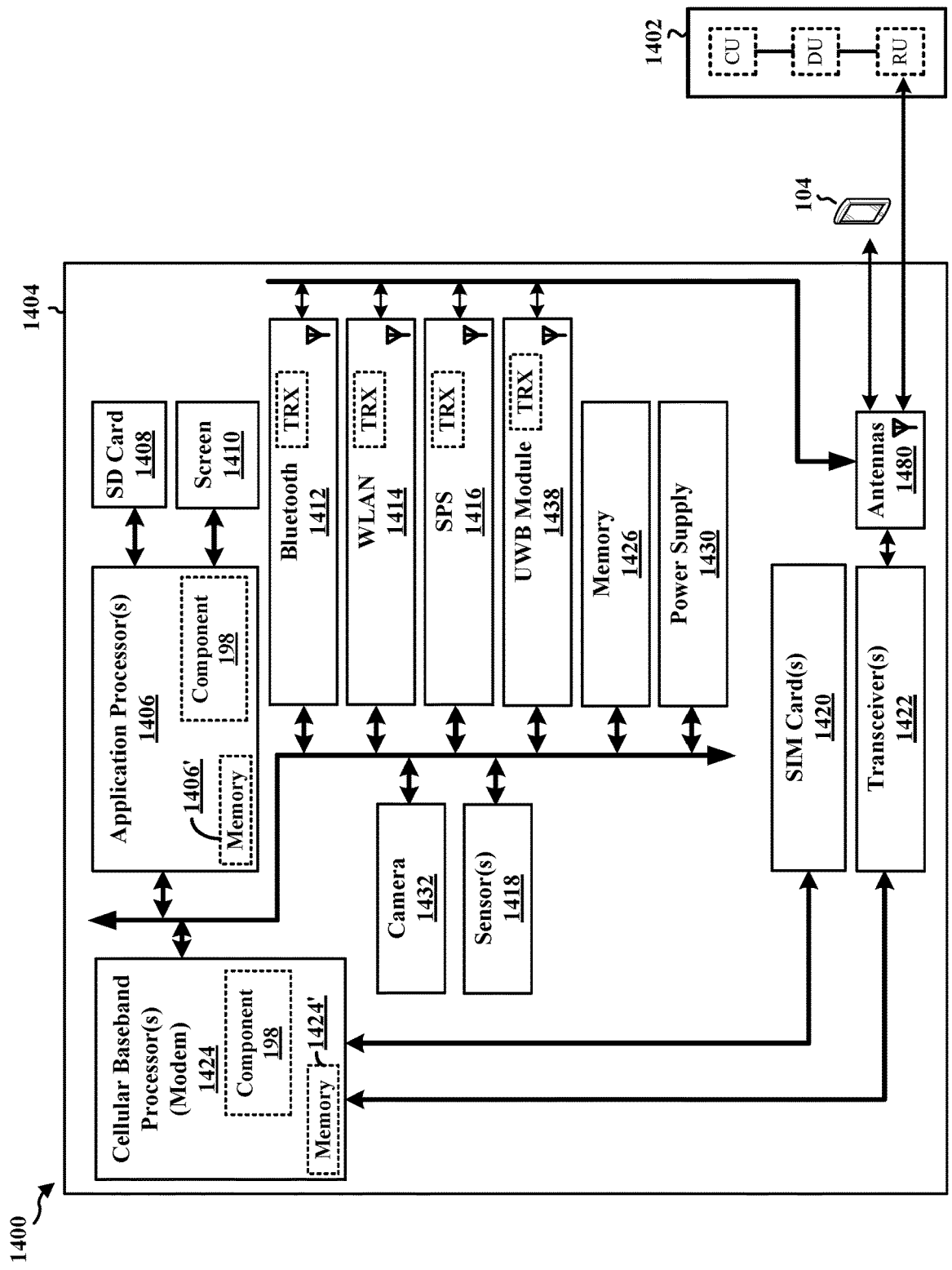
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an ultrawide band (UWB) module 1438 (e.g., a UWB transceiver), an SPS module 1416 (e.g., GNSS module), one or more sensors 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the UWB module 1438, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) 1424 communicates through the transceiver(s) 1422 via one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The cellular baseband processor(s) 1424 and the application processor(s) 1406 are configured to perform the various functions described supra based at least in part of the information stored in the memory. That is, the cellular baseband processor(s) 1424 and the application processor(s) 1406 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1424/application processor(s) 1406 when executing software. The cellular baseband processor(s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the dynamic PRF selection component 198 may be configured to detect a set of satellite signals for at least one satellite communication channel. The dynamic PRF selection component 198 may also be configured to identify a frequency for the detected set of satellite signals in the at least one satellite communication channel. The dynamic PRF selection component 198 may also be configured to select a PRF for a UWB communication of the UE, where the selected PRF is not an integer multiple of the identified frequency for the detected set of satellite signals in the at least one satellite communication channel. The dynamic PRF selection component 198 may be within the cellular baseband processor(s) 1424, the application processor(s) 1406, or both the cellular baseband processor(s) 1424 and the application processor(s) 1406. The dynamic PRF selection component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor(s) 1406, may include means for detecting a set of satellite signals for at least one satellite communication channel. The apparatus 1404 may further include means for identifying a frequency for the detected set of satellite signals in the at least one satellite communication channel. The apparatus 1404 may further include means for selecting a PRF for a UWB communication of the UE, where the selected PRF is not an integer multiple of the identified frequency for the detected set of satellite signals in the at least one satellite communication channel.

In one configuration, the apparatus 1404 may further include means for transmitting, to an entity participating in the UWB communication, the selected PRF for the UWB communication.

In another configuration, the apparatus 1404 may further include means for performing the UWB communication based on the selected PRF, and means for receiving the detected set of satellite signals, where the performance of the UWB communication and the reception of the detected set of satellite signals are simultaneous or at least partially overlapping in time.

In another configuration, the apparatus 1404 may further include means for calculating a position of the apparatus 1404 based on the reception of the detected set of satellite signals.

In another configuration, the means for performing the UWB communication may include configuring the apparatus 1404 to perform the UWB communication via a UWB transceiver, and the means for receiving the detected set of satellite signals may include configuring the apparatus 1404 to receive the detected set of satellite signals via a satellite signal receiver. In some implementations, the UWB transceiver and the satellite signal receiver may be within a same chipset.

In another configuration, the apparatus 1404 may further include means for receiving, prior to the performance of the UWB communication, a first request to perform the UWB communication, and means for receiving a second request to calculate a position of the apparatus 1404.

In another configuration, the means for detecting the set of satellite signals for the at least one satellite communication channel may include configuring the apparatus 1404 to perform an ED scan on the at least one satellite communication channel for a specified period of time, and detect, based on the ED scan, the set of satellite signals based on an energy level for the set of satellite signals being above an energy threshold.

In another configuration, the UWB communication may include at least one of a UWB transmission or a UWB reception.

In another configuration, the set of satellite signals may be a set of GPS signals or a set of GNSS signals.

In another configuration, the apparatus 1404 may further include means for detecting that the set of satellite signals for the at least one satellite communication channel is no longer available, and means for selecting a second PRF for the UWB communication irrespective of the frequency of the set of satellite signals.

In another configuration, the apparatus 1404 may further include means for detecting that the set of satellite signals for the at least one satellite communication channel is no longer available, and means for selecting the integer multiple of the identified frequency for the UWB communication.

In another configuration, the apparatus 1404 may further include means for transmitting, to at least one second UE, an indication of the selected PRF for the UWB communication. In some implementations, the means for transmitting the indication of the selected PRF for the UWB communication may include configuring the apparatus 1404 to broadcast, unicast, or advertise the indication of the selected PRF for the UWB communication via a beacon message or a beacon message format.

In another configuration, the apparatus 1404 may further include means for detecting a second set of satellite signals for at least one second satellite communication channel, identify a second frequency for the detected second set of satellite signals in the at least one second satellite communication channel, and means for selecting a second PRF for the UWB communication of the apparatus 1404, where the selected PRF is neither the integer multiple of the identified frequency nor the identified second frequency.

In another configuration, the apparatus 1404 may further include means for outputting an indication of the selected PRF for the UWB communication of the apparatus 1404. In some implementations, the means for outputting the indication of the selected PRF for the UWB communication of the apparatus 1404 may include configuring the apparatus 1404 to transmit the indication of the selected PRF for the UWB communication of the apparatus 1404, or store the indication of the selected PRF for the UWB communication of the apparatus 1404.

The means may be the dynamic PRF selection component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: detecting a set of satellite signals for at least one satellite communication channel; identifying a frequency for the detected set of satellite signals in the at least one satellite communication channel; and selecting a pulse repetition frequency (PRF) for an ultrawide band (UWB) communication of the UE, wherein the selected PRF is not an integer multiple of the identified frequency for the detected set of satellite signals in the at least one satellite communication channel.

Aspect 2 is the method of aspect 1, further comprising: performing the UWB communication based on the selected PRF; and receiving the detected set of satellite signals, wherein the performance of the UWB communication and the reception of the detected set of satellite signals are simultaneous or at least partially overlapping in time.

Aspect 3 is the method of aspect 2, further comprising: calculating a position of the UE based on the reception of the detected set of satellite signals.

Aspect 4 is the method of any of aspects 2 to 3, wherein performing the UWB communication comprises performing the UWB communication via a UWB transceiver, and wherein receiving the detected set of satellite signals comprises receiving the detected set of satellite signals via a satellite signal receiver.

Aspect 5 is the method of aspect 4, wherein the UWB transceiver and the satellite signal receiver are within a same chipset.

Aspect 6 is the method of any of aspects 2 to 5, further comprising: receiving, prior to the performance of the UWB communication, a first request to perform the UWB communication; and receiving a second request to calculate a position of the UE.

Aspect 7 is the method of any of aspects 1 to 6, wherein detecting the set of satellite signals for the at least one satellite communication channel comprises: performing an energy detection (ED) scan on the at least one satellite communication channel for a specified period of time; and detecting, based on the ED scan, the set of satellite signals based on an energy level for the set of satellite signals being above an energy threshold.

Aspect 8 is the method of any of aspects 1 to 7, further comprising: transmitting, to an entity participating in the UWB communication, the selected PRF for the UWB communication.

Aspect 9 is the method of any of aspects 1 to 8, wherein the UWB communication includes at least one of a UWB transmission or a UWB reception.

Aspect 10 is the method of aspect 9, wherein the set of satellite signals is a set of global positioning system (GPS) signals or a set of global navigation satellite system (GNSS) signals.

Aspect 11 is the method of any of aspects 1 to 10, further comprising: detecting that the set of satellite signals for the at least one satellite communication channel is no longer available; and selecting a second PRF for the UWB communication irrespective of the frequency of the set of satellite signals.

Aspect 12 is the method of any of aspects 1 to 11, further comprising: detecting that the set of satellite signals for the at least one satellite communication channel is no longer available; and selecting the integer multiple of the identified frequency for the UWB communication.

Aspect 13 is the method of any of aspects 1 to 12, further comprising: transmitting, to at least one second UE, an indication of the selected PRF for the UWB communication.

Aspect 14 is the method of aspect 13, wherein transmitting the indication of the selected PRF for the UWB communication comprises: broadcasting, unicasting, or advertising the indication of the selected PRF for the UWB communication via a beacon message or a beacon message format.

Aspect 15 is the method of any of aspects 1 to 14, further comprising: detecting a second set of satellite signals for at least one second satellite communication channel; identifying a second frequency for the detected second set of satellite signals in the at least one second satellite communication channel; and selecting a second PRF for the UWB communication of the UE, wherein the selected PRF is neither the integer multiple of the identified frequency nor the identified second frequency.

Aspect 16 is the method of any of aspects 1 to 15, further comprising: outputting an indication of the selected PRF for the UWB communication of the UE.

Aspect 17 is the method of aspect 16, wherein outputting the indication of the selected PRF for the UWB communication of the UE comprises: transmitting the indication of the selected PRF for the UWB communication of the UE; or storing the indication of the selected PRF for the UWB communication of the UE.

Aspect 18 is the method of any of aspects 1 to 17, wherein the frequency is a center frequency.

Aspect 19 is an apparatus for wireless communication at a user equipment (UE), including: at least one memory; and at least one processor coupled to the at least one memory and, based at least in part on information stored in the at least one memory, the at least one processor, individually or in any combination, is configured to implement any of aspects 1 to 18.

Aspect 20 is the apparatus of aspect 19, further including at least one transceiver or one or more sensors coupled to the at least one processor.

Aspect 21 is an apparatus for wireless communication at a user equipment (UE) including means for implementing any of aspects 1 to 18.

Aspect 22 is a computer-readable medium (e.g., a non-transitory computer-readable medium) storing computer executable code, where the code when executed by a processor causes the processor to implement any of aspects 1 to 18.

What is claimed is:

1. An apparatus for wireless communication at a user equipment (UE), comprising:
at least one memory; and
at least one processor coupled to the at least one memory, the at least one processor, individually or in any combination, is configured to:
detect a set of satellite signals for at least one satellite communication channel;
identify a frequency for the detected set of satellite signals in the at least one satellite communication channel; and
select a pulse repetition frequency (PRF) for an ultrawide band (UWB) communication of the UE based on detection of the set of satellite signals, wherein the selected PRF is not an integer multiple of the identified frequency for the detected set of satellite signals in the at least one satellite communication channel.

2. The apparatus of claim 1, wherein the at least one processor, individually or in any combination, is further configured to:
perform the UWB communication based on the selected PRF; and
receive the detected set of satellite signals, wherein the performance of the UWB communication and the reception of the detected set of satellite signals are simultaneous or at least partially overlapping in time.

3. The apparatus of claim 2, wherein the at least one processor, individually or in any combination, is further configured to:
calculate a position of the UE based on the reception of the detected set of satellite signals.

4. The apparatus of claim 2, wherein to perform the UWB communication, the at least one processor, individually or in any combination, is configured to perform the UWB communication via a UWB transceiver, and wherein to receive the detected set of satellite signals, the at least one processor, individually or in any combination, is configured to receive the detected set of satellite signals via a satellite signal receiver.

5. The apparatus of claim 4, wherein the UWB transceiver and the satellite signal receiver are within a same chipset.

6. The apparatus of claim 2, wherein the at least one processor, individually or in any combination, is further configured to:
receive, prior to the performance of the UWB communication, a first request to perform the UWB communication; and
receive a second request to calculate a position of the UE.

7. The apparatus of claim 1, wherein to detect the set of satellite signals for the at least one satellite communication channel, the at least one processor, individually or in any combination, is configured to:
perform an energy detection (ED) scan on the at least one satellite communication channel for a specified period of time; and
detect, based on the ED scan, the set of satellite signals based on an energy level for the set of satellite signals being above an energy threshold.

8. The apparatus of claim 1, wherein the at least one processor, individually or in any combination, is further configured to:
detect that the set of satellite signals for the at least one satellite communication channel is no longer available; and
select a second PRF for the UWB communication irrespective of the frequency of the set of satellite signals.

9. The apparatus of claim 1, wherein the at least one processor, individually or in any combination, is further configured to:
detect that the set of satellite signals for the at least one satellite communication channel is no longer available; and
select the integer multiple of the identified frequency for the UWB communication.

10. The apparatus of claim 1, wherein the at least one processor, individually or in any combination, is further configured to:
transmit, to at least one second UE, an indication of the selected PRF for the UWB communication.

11. The apparatus of claim 10, wherein transmitting the indication of the selected PRF for the UWB communication comprises:
broadcast, unicast, or advertise the indication of the selected PRF for the UWB communication via a beacon message or a beacon message format.

12. The apparatus of claim 1, wherein the at least one processor, individually or in any combination, is further configured to:
detect a second set of satellite signals for at least one second satellite communication channel;
identify a second frequency for the detected second set of satellite signals in the at least one second satellite communication channel; and
select a second PRF for the UWB communication of the UE, wherein the selected PRF is neither the integer multiple of the identified frequency nor the identified second frequency.

13. The apparatus of claim 1, wherein the at least one processor, individually or in any combination, is further configured to:
output an indication of the selected PRF for the UWB communication of the UE.

14. The apparatus of claim 13, wherein to output the indication of the selected PRF for the UWB communication of the UE, the at least one processor, individually or in any combination, is configured to:
transmit the indication of the selected PRF for the UWB communication of the UE; or
store the indication of the selected PRF for the UWB communication of the UE.

15. A method of wireless communication at a user equipment (UE), comprising:
detecting a set of satellite signals for at least one satellite communication channel;
identifying a frequency for the detected set of satellite signals in the at least one satellite communication channel; and
selecting a pulse repetition frequency (PRF) for an ultra-wide band (UWB) communication of the UE based on detection of the set of satellite signals, wherein the selected PRF is not an integer multiple of the identified frequency for the detected set of satellite signals in the at least one satellite communication channel.

16. The method of claim 15, further comprising:
performing the UWB communication based on the selected PRF; and
receiving the detected set of satellite signals, wherein the performance of the UWB communication and the reception of the detected set of satellite signals are simultaneous or at least partially overlapping in time.

17. The method of claim 16, further comprising:
calculating a position of the UE based on the reception of the detected set of satellite signals.

18. The method of claim 16, wherein performing the UWB communication comprises performing the UWB communication via a UWB transceiver, and wherein receiving the detected set of satellite signals comprises receiving the detected set of satellite signals via a satellite signal receiver.

19. The method of claim 18, wherein the UWB transceiver and the satellite signal receiver are within a same chipset.

20. The method of claim 16, further comprising:
receiving, prior to the performance of the UWB communication, a first request to perform the UWB communication; and
receiving a second request to calculate a position of the UE.

21. The method of claim 15, wherein detecting the set of satellite signals for the at least one satellite communication channel comprises:
  performing an energy detection (ED) scan on the at least one satellite communication channel for a specified period of time; and
  detecting, based on the ED scan, the set of satellite signals based on an energy level for the set of satellite signals being above an energy threshold.

22. The method of claim 15, further comprising:
  detecting that the set of satellite signals for the at least one satellite communication channel is no longer available; and
  selecting a second PRF for the UWB communication irrespective of the frequency of the set of satellite signals.

23. The method of claim 15, further comprising:
  detecting that the set of satellite signals for the at least one satellite communication channel is no longer available; and
  selecting the integer multiple of the identified frequency for the UWB communication.

24. The method of claim 15, further comprising:
  transmitting, to at least one second UE, an indication of the selected PRF for the UWB communication.

25. The method of claim 24, wherein transmitting the indication of the selected PRF for the UWB communication comprises:
  broadcasting, unicasting, or advertising the indication of the selected PRF for the UWB communication via a beacon message or a beacon message format.

26. The method of claim 15, further comprising:
  detecting a second set of satellite signals for at least one second satellite communication channel;
  identifying a second frequency for the detected second set of satellite signals in the at least one second satellite communication channel; and
  selecting a second PRF for the UWB communication of the UE, wherein the selected PRF is neither the integer multiple of the identified frequency nor the identified second frequency.

27. The method of claim 15, further comprising:
  outputting an indication of the selected PRF for the UWB communication of the UE.

28. The method of claim 27, wherein outputting the indication of the selected PRF for the UWB communication of the UE comprises:
  transmitting the indication of the selected PRF for the UWB communication of the UE; or
  storing the indication of the selected PRF for the UWB communication of the UE.

29. An apparatus for wireless communication at a user equipment (UE), comprising:
  means for detecting a set of satellite signals for at least one satellite communication channel;
  means for identifying a frequency for the detected set of satellite signals in the at least one satellite communication channel; and
  means for selecting a pulse repetition frequency (PRF) for an ultrawide band (UWB) communication of the UE based on detection of the set of satellite signals, wherein the selected PRF is not an integer multiple of the identified frequency for the detected set of satellite signals in the at least one satellite communication channel.

30. A non-transitory computer-readable medium storing computer executable code, the code when executed by at least one processor causes the at least one processor to:
  detect a set of satellite signals for at least one satellite communication channel;
  identify a frequency for the detected set of satellite signals in the at least one satellite communication channel; and
  select a pulse repetition frequency (PRF) for an ultrawide band (UWB) communication based on detection of the set of satellite signals, wherein the selected PRF is not an integer multiple of the identified frequency for the detected set of satellite signals in the at least one satellite communication channel.

* * * * *